United States Patent
El Kolli et al.

(10) Patent No.: US 9,300,979 B2
(45) Date of Patent: Mar. 29, 2016

(54) METHODS FOR TRANSMITTING AND RECEIVING DATA CONTENTS, CORRESPONDING SOURCE AND DESTINATION NODES AND STORAGE MEANS

(75) Inventors: Yacine El Kolli, Rennes (FR); Alain Caillerie, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 13/081,386

(22) Filed: Apr. 6, 2011

(65) Prior Publication Data

US 2012/0059948 A1 Mar. 8, 2012

(30) Foreign Application Priority Data

Sep. 4, 2010 (FR) ...................................... 10 52713

(51) Int. Cl.
| | |
|---|---|
| *G06F 15/16* | (2006.01) |
| *H04N 19/59* | (2014.01) |
| *H04N 19/61* | (2014.01) |
| *H04N 19/37* | (2014.01) |
| *H04N 19/112* | (2014.01) |
| *H04N 19/132* | (2014.01) |
| *H04N 19/186* | (2014.01) |
| *H04N 19/166* | (2014.01) |
| *H04N 19/182* | (2014.01) |

(Continued)

(52) U.S. Cl.
CPC ............. *H04N 19/59* (2014.11); *H04N 19/112* (2014.11); *H04N 19/132* (2014.11); *H04N 19/166* (2014.11); *H04N 19/182* (2014.11); *H04N 19/186* (2014.11); *H04N 19/37* (2014.11); *H04N 19/39* (2014.11); *H04N 19/61* (2014.11); *H04N 19/895* (2014.11)

(58) Field of Classification Search
USPC .......................................................... 709/231
See application file for complete search history.

(56) References Cited

U.S. PATENT DOCUMENTS

| 1,331,018 | A | * | 2/1920 | Luthy ........................... 429/143 |
| 2,109,317 | A | * | 2/1938 | Johnson ......................... 169/23 |
| 4,710,964 | A | * | 12/1987 | Yamaguchi et al. .......... 382/191 |

(Continued)

FOREIGN PATENT DOCUMENTS

| EP | 2109317 A1 | 10/2009 |
| WO | WO2005094084 A1 | 10/2005 |

OTHER PUBLICATIONS

Chan K I et al., "Block shuffling on top of error concealment for wireless image transmissions", PIMIRC '96, vol. 3, Oct. 15, 1996, pp. 977-981.

(Continued)

*Primary Examiner* — Faruk Hamza
*Assistant Examiner* — Shah R Zaman
(74) *Attorney, Agent, or Firm* — Canon U.S.A., Inc. IP Division

(57) ABSTRACT

A method is proposed for transmitting at least two data contents by means of a source node to a destination node via at least two transmission paths. The method for transmitting includes steps of: sub-dividing each content into a succession of elementary data groups according to a predetermined pattern of repetition comprising at least two types of different elementary groups; transmitting elementary groups on at least one of the paths, according to a predefined alternation of elementary groups resulting from the sub-division of at least two different contents.

15 Claims, 16 Drawing Sheets

(51) Int. Cl.
*H04N 19/39* (2014.01)
*H04N 19/895* (2014.01)

(56) References Cited

U.S. PATENT DOCUMENTS

| | | | | |
|---|---|---|---|---|
| 5,586,200 | A * | 12/1996 | Devaney et al. | 382/232 |
| 7,197,073 | B2 * | 3/2007 | Furuta | 375/240.1 |
| 7,328,292 | B2 * | 2/2008 | Nishikawa | 710/113 |
| 7,596,377 | B2 * | 9/2009 | Barberis et al. | 455/446 |
| 7,899,088 | B2 * | 3/2011 | Song et al. | 370/536 |
| 2004/0105423 | A1 * | 6/2004 | Koehler et al. | 370/351 |
| 2005/0165853 | A1 * | 7/2005 | Turpin et al. | 707/200 |
| 2005/0196151 | A1 * | 9/2005 | Takagi et al. | 386/124 |
| 2007/0133497 | A1 * | 6/2007 | Vare et al. | 370/345 |
| 2007/0177579 | A1 * | 8/2007 | Diethorn et al. | 370/352 |
| 2009/0021646 | A1 * | 1/2009 | Shao et al. | 348/608 |
| 2009/0238286 | A1 * | 9/2009 | Kim et al. | 375/240.27 |
| 2010/0254458 | A1 * | 10/2010 | Amon et al. | 375/240.13 |
| 2012/0179835 | A1 * | 7/2012 | Morris et al. | 709/238 |
| 2013/0142108 | A1 * | 6/2013 | Ji et al. | 370/315 |

OTHER PUBLICATIONS

Wang Y et al., "Wireless video transport using path diversity: mulitple description vs. layered coding", IEEE, vol. 1, Sep. 22, 2002, pp. 21-24.

* cited by examiner

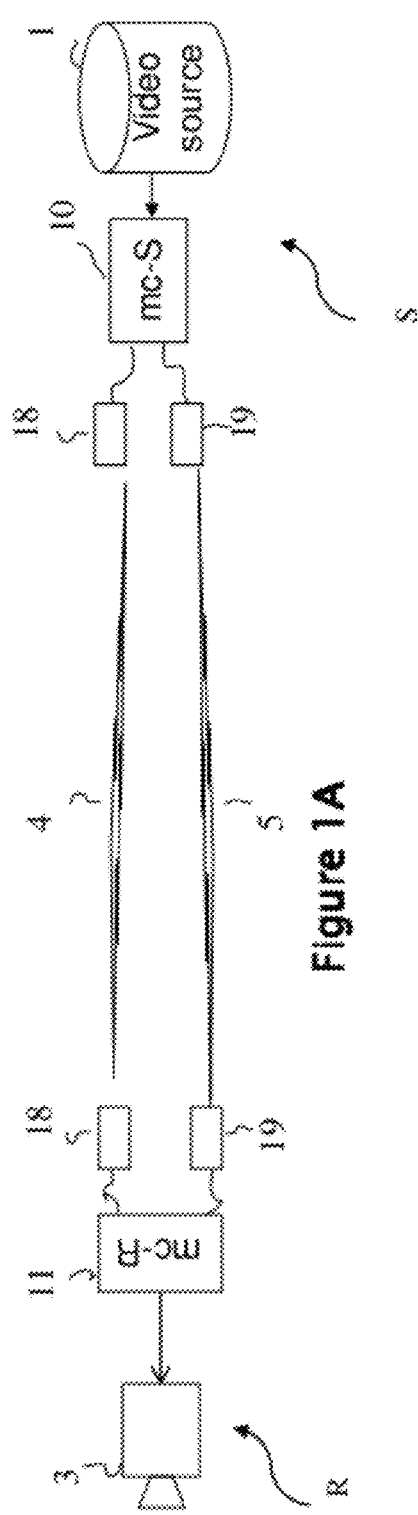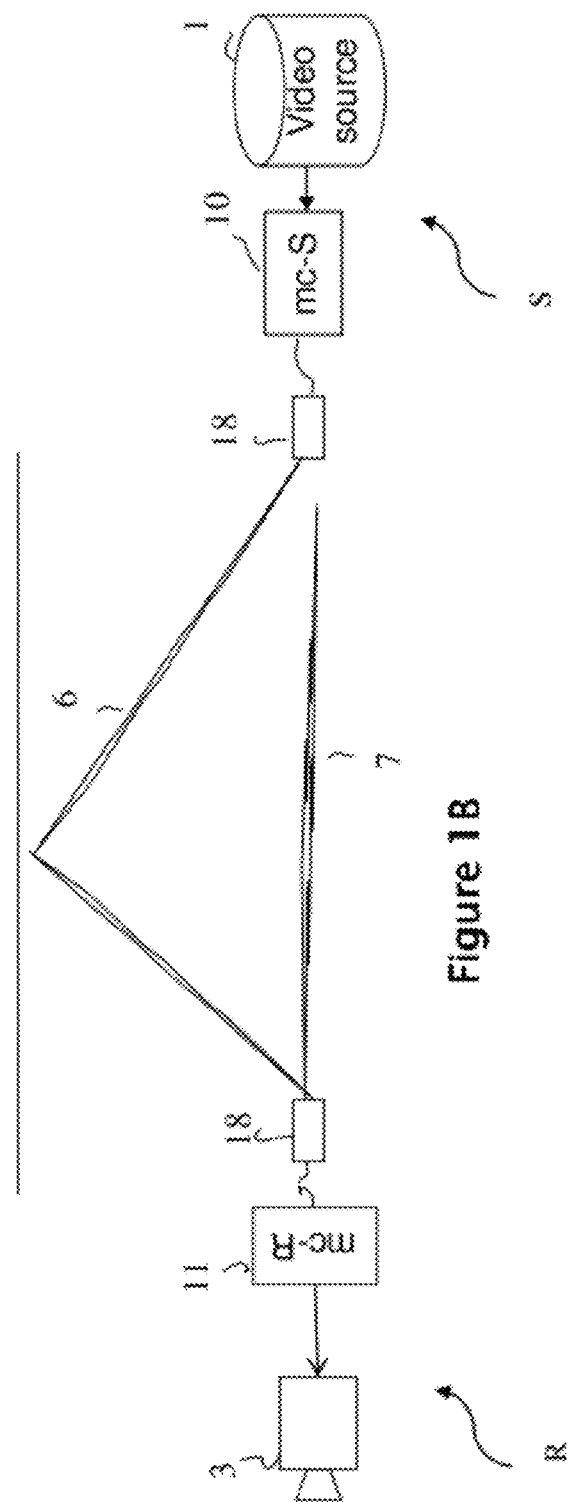
Figure 1A
Figure 1B

Figure 6

| | Schemes | 1st path | 2nd path |
|---|---|---|---|
| Two radio interfaces | Transmission scheme S1 | 100% right video odd lines<br>100% left video even lines | 100% right video even lines<br>100% left video odd lines |
| | Transmission scheme S2 (standard) | 100% right video L1 lines<br>100% left video L2 lines | 100% right video L2 lines<br>100% left video L1 lines |
| | Transmission scheme S3 (1st path disturbed) | 100% right video L2 lines<br>100% left video L2 lines | 50% right video L1 lines<br>100% left video L1 lines |
| One radio interface, two trajectories | Transmission scheme S4 (1st path cut) | X | 25% right video L1 lines<br>100% right video L2 lines<br>25% left video L1 lines<br>100% left video L2 lines |
| | Transmission scheme S5 (2nd path disturbed) | 50% right video L1 lines<br>100% left video L1 lines | 100% right video L2 lines<br>100% left video L2 lines |
| | Transmission scheme S6 (2nd path cut) | 25% right video L1 lines<br>100% right video L2 lines<br>25% left video L1 lines<br>100% left video L2 lines | X |

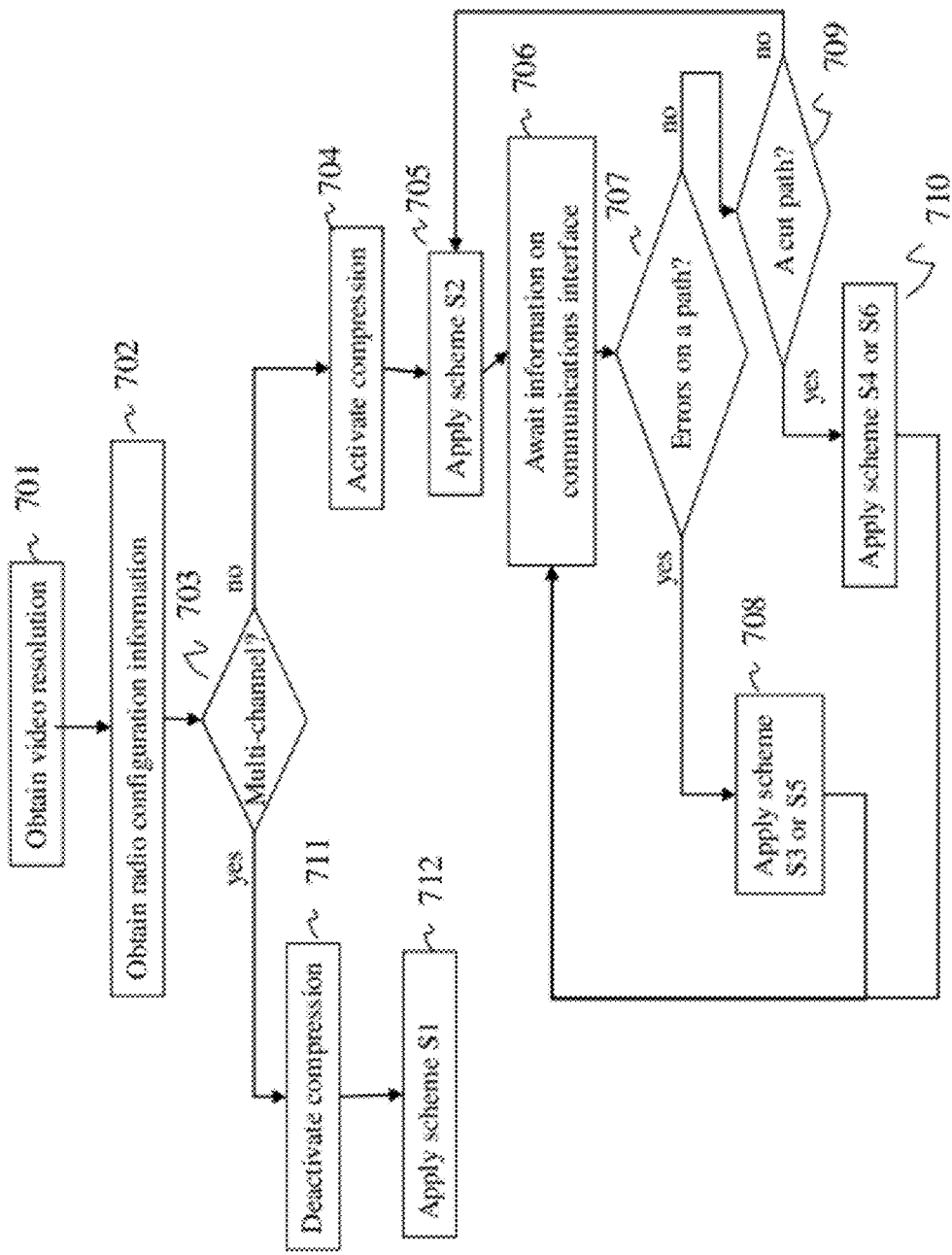

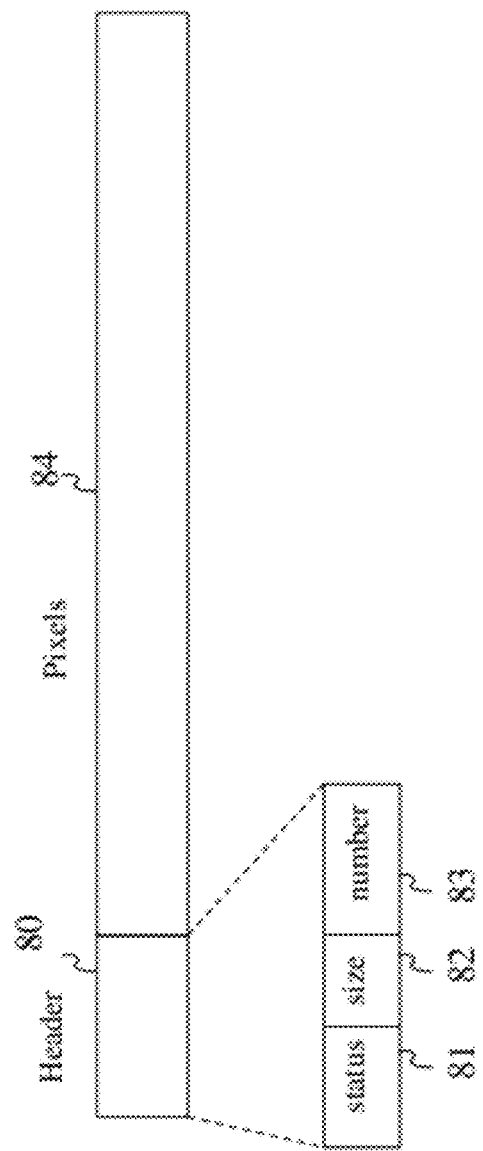

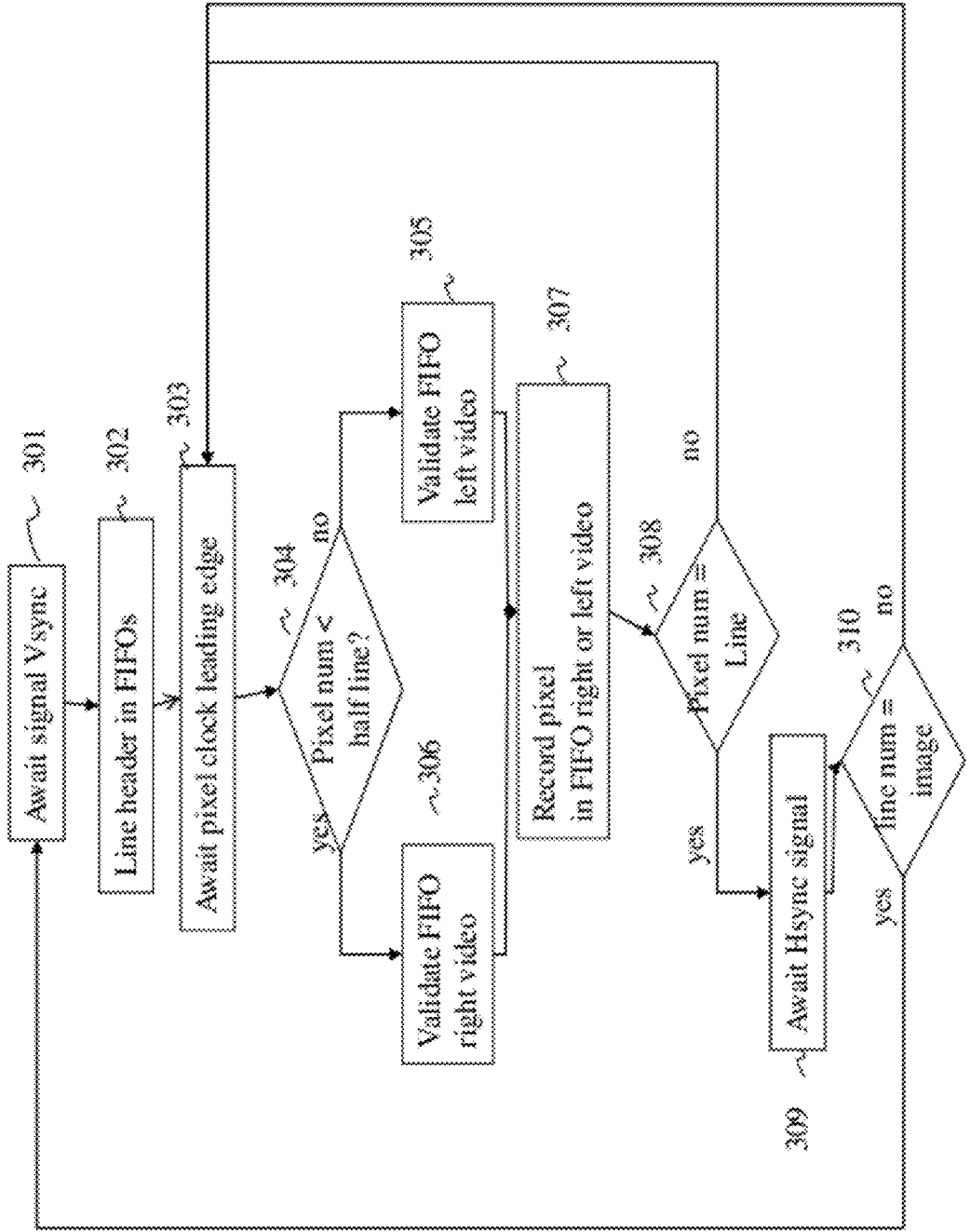

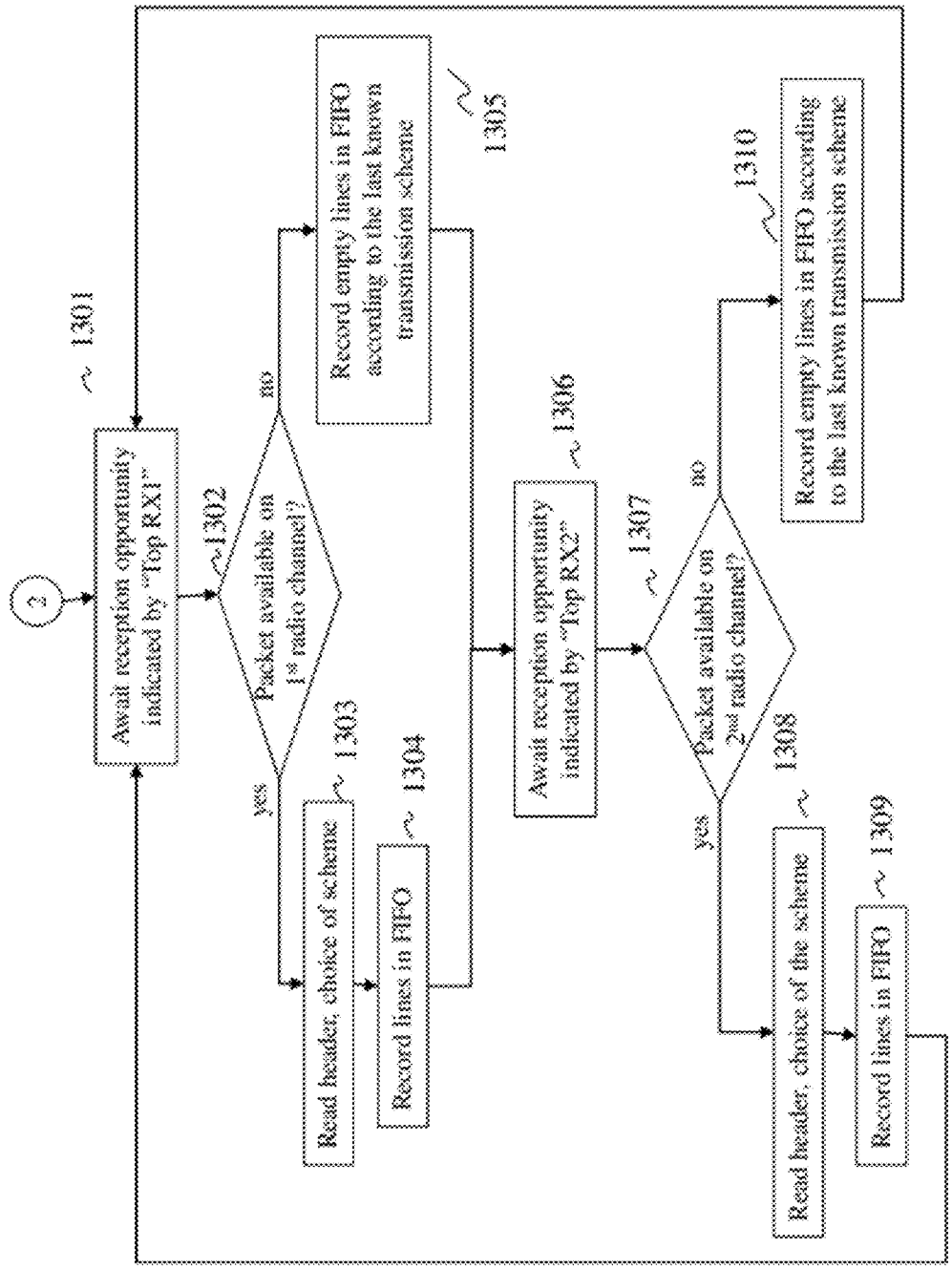

Figure 14A
Scheme S1
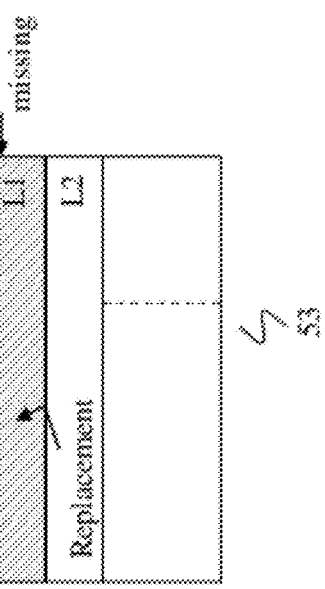
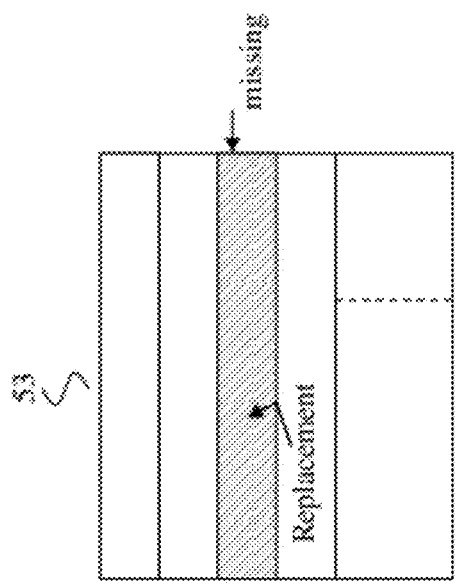
Figure 14B
Scheme S2
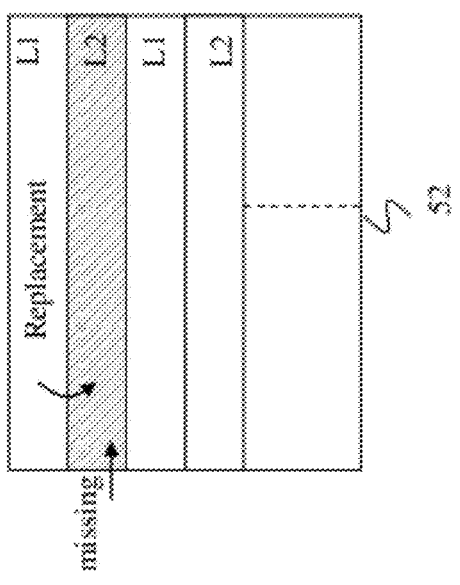
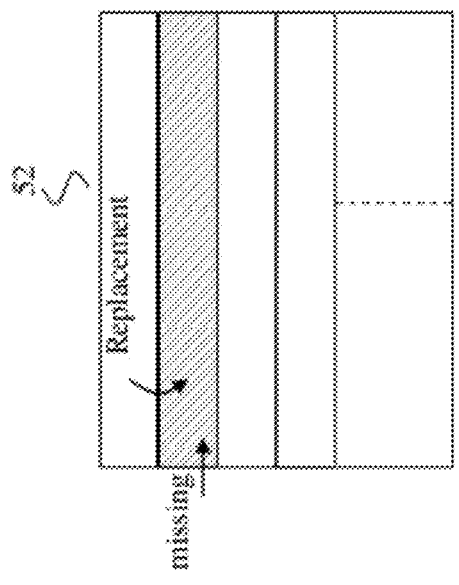

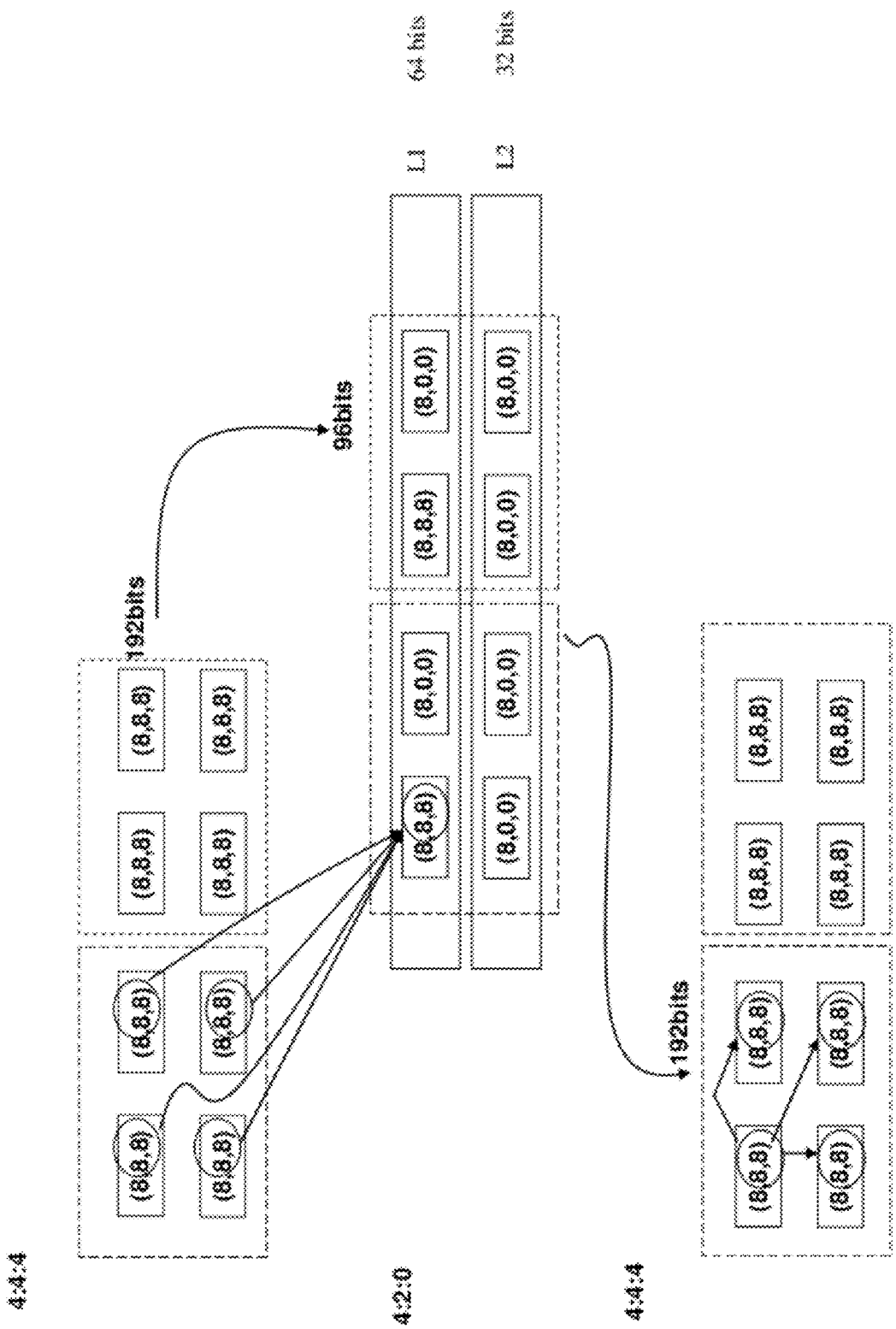

METHODS FOR TRANSMITTING AND RECEIVING DATA CONTENTS, CORRESPONDING SOURCE AND DESTINATION NODES AND STORAGE MEANS

CROSS REFERENCE TO RELATED APPLICATIONS

This application claims priority to French Patent Application No. 1052713 filed Apr. 9, 2010, which is hereby incorporated by reference in its entirety.

BACKGROUND OF THE INVENTION

1. Field of the Disclosure

The field of the disclosure is that of data transmission between two apparatuses. More specifically, an embodiment of the invention pertains to a technique for transmitting one or more contents (for example video type contents), by means of a source node, on several transmission paths, to a destination node.

The invention has many applications, such as for example the transmission of video at high bit rates to a screen of a very high definition home cinema type system or else to screen panels of a showroom type system.

2. Technological Background

It is sought more particularly here below in this document to describe problems existing in the field of the transportation of high bit rate video contents through wireless systems. The invention of course is not limited to this particular field of application but is of interest for any technique for transmitting video streams or transmitting images that has to cope with closely related or similar issues and problems.

The video contents considered are for example of a resolution higher than the 1080 p standard HD format. In this case, since the bit rate needed for transmitting this type of video is greater than the bit rate currently available in 60 GHz wireless networks, the video is at least weakly compressed (for example according to what is called the chromatic sub-sampling technique).

A pixel of a video screen according to the "YUV" or "YCbCr" standard format is represented by three digital values. One is a luminance component containing information on luminosity while the other two are chrominance components containing color information. It is common for these three values to be each encoded on eight bits. The chromatic sub-sampling technique is based on the accepted principle that the human eye is most sensitive to variations in luminosity than to color variations. Based on this, the chromatic sub-sampling technique consists in eliminating a part of the chrominance information elements and regenerating them approximately according to extrapolation techniques.

60 GHz wireless systems are used to attain very high bit rates (currently of the order of 3 Gbits/s) over short ranges (of the order of about 10 meters currently). They use two prior-art antenna management techniques:

beamsteering technique by beamforming which is well suited to a point-to-point communications mode. It is used to concentrate the emission energy more efficiently on one or more desired direction. It calls for a preliminary configuring phase during which the antenna angles are adjusted so as to obtain the highest efficiency. This technique however is very sensitive to shadowing;

a wide-angle or omnidirectional antenna technique which is well suited to a mode of communications by broadcasting. This technique is less sensitive to masking than the directional technique. However, since the energy is more diffuse than in the case of the directional technique, the reception quality is thereby diminished.

The wireless systems referred to here above have a major drawback which is their high sensitivity to shadowing. For example, the simple passage of a person on a path set up between the sender and receiver antennas cuts off data transmission between the two corresponding nodes, namely the sender and receiver nodes.

A first known solution to this problem of sensitivity to shadowing is that of installing the antennas of the system beyond the range of moving obstacles in a room. For example, the antennas are fixed at a height so that persons can freely move about in the room.

However, this first prior-art solution has the problem of requiring that audio/video apparatuses having radio interfaces be fixed at a height. This reduces accessibility to apparatuses as well as the anticipated advantage of a wireless system that would permit greater flexibility in the positioning of the apparatuses.

A second known solution to this problem of sensitivity to shadowing consists in transmitting a same piece of data several times through different paths. This technique, known as a mesh technique, relies on spatial diversity. The sender node sends data in omnidirectional mode and then a certain number of receiver nodes relay these pieces of data, thus creating a multitude of copies of the same piece of data, these copies being thus available from different geographical points of the network.

This second prior-art solution is well suited solely to the transportation of data at low bit rates such as the transportation of audio streams, but it is not suited not to the transportation of video data streams necessitating high bit rate. Indeed, the multiplication of re-transmissions consumes bandwidth. In the prior art, it is not possible to greatly increase transmissions of video data unless the video stream is very highly compressed. Now a highly compressed video stream is considered to be of mediocre or even poor quality.

A third known technique is described in the US patent document 2009/0021646. This is a method of video transmission for a wireless transmission system in which it is proposed to sub-divide the video signal to be transmitted according to groups of dots spatially grouped together and to send these groups on one or more radio channels (i.e. different paths) as a function of the conditions of transmission on the channels. In this prior-art technique:

it is sought, as a priority, to transmit the totality of the video along a determined path (main path). If possible, the other paths are used to provide information on redundancy, if the transmission errors occur on the main path;

if the main path does not enable transmission of all the video data, then the different paths are used to transmit the totality of the video data, whether distributedly or not.

One drawback of this known third technique is that, for each transmitted packet, it necessitates also the transmission of information describing the transmitted packet (type of packet and quantity of data contained in the packet) to enable the image to be reconstituted). These information items therefore consume a part of the bandwidth (with an increase in the overhead).

One drawback of this known third technique is that, for each transmitted packet, it necessitates also the transmission of information describing the transmitted packet (type of packet and quantity of data contained in the packet) to enable the image to be reconstituted). These information items therefore consume a part of the bandwidth (with an increase in the overhead).

Furthermore, the US patent document 2009/0021646 proposes no solution whatsoever for the transmission of at least two contents (i.e. in the context of an embodiment of the present invention).

Another drawback of this third prior-art technique is that it is not suited to the transmission of compressed videos or weakly compressed videos. Indeed, the compression technique can change the quantity of information needed to represent a pixel. Typically, the techniques of compression by chromatic sub-sampling deliver a non-homogeneous stream of pixels (certain pixels being encoded with fewer bits than others). Now this third prior-art technique is not suited to managing a variable quantity of data for a pixel.

SUMMARY

One particular embodiment of the invention proposes a method for transmitting at least two data contents by means of a source node to a destination node, via at least two transmission paths, said method for transmitting including steps of:
- sub-dividing each content into a succession of elementary data groups according to a predetermined pattern of repetition comprising at least two types of different elementary groups,
- transmitting elementary groups on at least one of said paths, according to a predefined alternation of elementary groups resulting from the sub-division of at least two different contents.

The general principle of an embodiment of the invention therefore lies in the use of several transmission paths between the source node and the destination node and the distribution of the contents to be transmitted on these paths in an original way: on one or more of these paths (the number of paths concerned is for example a function of the condition of transmission on these paths) elementary data groups which do not all result from the sub-division of the same content are mixed together.

Thus, as compared with a trivial solution for transmitting a different content on each of the paths, the proposed technique is less sensitive to the shadowing phenomenon since if one path is disturbed by a masking, one or more other paths (not masked) enable the accurate transmission of certain pieces of data of the different contents. As described in detail further below, it is then possible to carry out error concealment on the basis of the received data.

As compared with a system using several paths solely to create redundancy (the above-mentioned known second solution), the proposed technique calls for less bandwidth and therefore enables the transmission of contents comprising a greater quantity of data, such as for example uncompressed (raw) video or weakly compressed video contents.

In a first implementation, each content is a video stream including images compressed according to a predetermined compressed scheme, each video stream comprising first and second types of compressed line, the compressed lines of the first type comprising additional information not present in the compressed lines of the second type and enabling a decompression of the compressed lines of the second type. Furthermore, said pattern of repetition comprises at least one compressed line of the first type and at least one compressed line of the second type.

Thus, the present technique applies especially to the transmission of compressed videos and preferably weakly compressed videos.

Preferably, said predetermined compression scheme is a scheme for compression by chromatic sub-sampling, the lines of the first type comprising chrominance information and the lines of the second type comprising no chrominance information.

Advantageously, the method for transmitting includes a step of selecting a transmission scheme as a function of at least one piece of information on quality of transmission on at least one of the paths, said transmission scheme defining, for each path, a predetermined alternation of elementary groups.

Thus, it is possible to dynamically adjust the transmission scheme according to the conditions of transmission on the different paths between the source node and the destination node, and thus optimize the use of the plurality of paths by giving preference for example to the path or paths that are least sensitive to the effects of shadowing or cuts.

Advantageously, for transmitting first and second video streams on first and second paths, then in said second step for selecting, if the quality of transmission is substantially identical on said first and second paths, a first transmission scheme is selected such that:
- on the first path, elementary groups are transmitted according to a predetermined alternation of lines of the first type of the first video stream and lines of the second type of the second video stream;
- on the second path, elementary groups are transmitted according to a predetermined alternation of lines of the second type of the first video stream and lines of the first type of the second video stream.

Thus, with this first transmission scheme, any defects of rendering (for example during the display of the contents on the screen) resulting from disturbances on at least one of the transmission paths are distributed homogeneously. Indeed, transient disturbances on one of the paths prompt defects of rendering distributed on both contents (uniform deterioration).

Advantageously, for transmitting first and second video streams on first and second paths, in said step of selecting, if quality of transmission on the first path is below quality of transmission on the second path, a second transmission scheme is selected such that:
- on the first path, elementary groups are transmitted according to a predetermined alternation of lines of the second type of the first video stream and lines of the second type of the second video stream;
- on the second path, elementary groups are transmitted in a predetermined alternation of lines of the first type of the first video stream and lines of the first type of the second video stream, lines of the first type of at least of at least one of the first and second video streams being not transmitted.

Thus, with this second transmission scheme, the lines of greater importance (i.e. the lines of the first type, since they contain additional information not present in the lines of the second type) are made to pass on the path which, in principle, enables better-quality transmission. Thus, a processing of error concealment in reception should give a better rendering of the video data.

Advantageously, for transmitting first and second video streams on first and second paths, in said step of selecting, if the first path is inoperative, a third transmission scheme is selected such that:
- on the second path, elementary groups are transmitted according to a predetermined alternation of lines of the first and second types of the first video stream and lines of the first and second types of the second video stream, lines of the first type of at least one of the first and second video streams being not transmitted.

Thus, with this third transmission scheme, all the types of lines are made to pass to the path which is operative.

In a second particular implementation ("without compression"), each content is a video stream comprising images having even-parity indexed lines and odd-parity indexed lines, and said pattern of repetition comprises at least one even-parity indexed line and at least one odd-parity indexed line.

Thus, because it optimizes the use of the bandwidth, the present embodiment of the invention can be applied to the transmission of raw video and enables the damage caused by interference undergone during the transmission of the data to be distributed over the different contents. This facilitates error concealment at reception.

Advantageously, for transmitting first and second video streams on first and second paths, the method includes a step of applying a predetermined transmission scheme such that:
  on the first path, elementary groups are transmitted according to a predetermined alternation of even-parity indexed lines of the first video stream and odd-parity indexed lines of the second video stream;
  on the second path, elementary groups are transmitted according to a predetermined alternation of odd-parity indexed lines of the first video stream and even-parity indexed lines of the second video stream.

Thus, with this transmission scheme, possible defects of rendering resulting from disturbance on at least one of the transmission paths are distributed homogeneously. Indeed, transient disturbances on one of the paths prompt defects of rendering distributed over both contents (uniform deterioration).

Advantageously, the method for transmitting includes a step of dividing a source content to obtain said at least two contents.

Thus, should it be desired to transmit a source content (this is for example a video stream to be displayed on a screen), the operation starts by dividing it into several contents to enable the application of the concept described and discussed here above.

It is clear however that the present technique can be applied when at least two contents to be transmitted have been generated separately (these are for example two independent video streams to be displayed simultaneously on two adjacent screens).

It is then a goal of an embodiment of the invention to try and distribute, uniformly on both adjacently displayed paths, the damage caused by interference undergone during data transmission. This provides for a better perceived quality at the user level.

According to one advantageous characteristic, each path uses a distinct radio channel and/or uses a distinct transmission trajectory, each transmission trajectory being defined by a specific configuration of at least one antenna among a send antenna included in the source node and a receive antenna included in the destination node.

Thus, an embodiment of the present invention can be applied both to the case where several radio interfaces are available (each path then uses a distinct radio interface) and to the case where a single radio interface is available (each path then uses a distinct transmission trajectory). It is of course also possible to combine the use of several radio interfaces with the use of different transmission trajectories, several trajectories being capable of using a same radio interface but with different transmission trajectories.

In another embodiment, the invention relates to a method for receiving at least two data contents transmitted by a source node via at least two transmission paths by means of a destination node, said method for receiving including steps of:
  receiving elementary groups via at least one of said transmission paths, according to a predefined alternation of elementary groups resulting from the sub-division of at least two different contents;
  recomposing each content as a function of received elementary groups, and as a function of a known predetermined pattern of repetition comprising at least two types of different elementary groups, said pattern of repetition having been used by the source node to sub-divide each content into a succession of elementary data groups.

Advantageously, the method for receiving includes a step of reconstituting a source content from the at least two recomposed contents.

This corresponds to the case where, in order to transmit a source content, the source node has divided it into several contents in order to be able to apply the concept described and discussed here above.

In another embodiment, there is proposed a non-transitory computer-readable storage means storing a computer program comprising a set of instructions executable by a computer to implement the above-mentioned method for transmitting (in any one of its different embodiments).

In another embodiment, there is proposed a non-transitory computer-readable storage means storing a computer program comprising a set of instructions executable by a computer to implement the above-mentioned method for receiving (in any one of its different embodiments).

In another embodiment, there is proposed a source node for transmitting at least two data contents to a destination node via at least two transmission paths, said source node including:
  means for sub-dividing each content into a succession of elementary data groups according to a predetermined pattern of repetition comprising at least two types of different elementary groups,
  means for transmitting elementary groups via at least one of said paths, according to a predefined alternation of elementary groups resulting from the sub-division of at least two different contents.

In another embodiment, there is proposed a destination node for receiving at least two data contents transmitted by a source node via at least two transmission paths, said destination node including:
  means for receiving elementary groups via at least one of said transmission paths, according to a predefined alternation of elementary groups resulting from the sub-division of at least two different contents;
  means for recomposing each content as a function of received elementary groups and as a function of a known predetermined pattern of repetition comprising at least two types of different elementary groups, said pattern of repetition having been used by the source node to sub-divide each content into a succession of elementary data groups.

LIST OF FIGURES

Other features and advantages of embodiments of the invention shall appear from the following description, given by way of an indicative and non-exhaustive example, and from the appended drawings, of which:

FIGS. 1A and 1B schematically illustrate two systems each enabling the implementation of a particular embodiment of the invention;

FIG. 6 illustrates different schemes of transmission of video lines according to one particular embodiment of the invention;

FIG. 7 is a flowchart of an example of an algorithm for selecting a video transmission scheme among those of FIG. 6;

FIG. 8 is a schematic illustration of the format of the video lines during their storage in FIFO type memories according to one particular embodiment of the invention;

FIG. 9 is a flowchart of an example of an algorithm describing the working of the division module 41 of the video stream;

FIGS. 12 and 13 are a flowchart of an example of an algorithm describing the working of the de-packetizing module 51;

Figure 5:
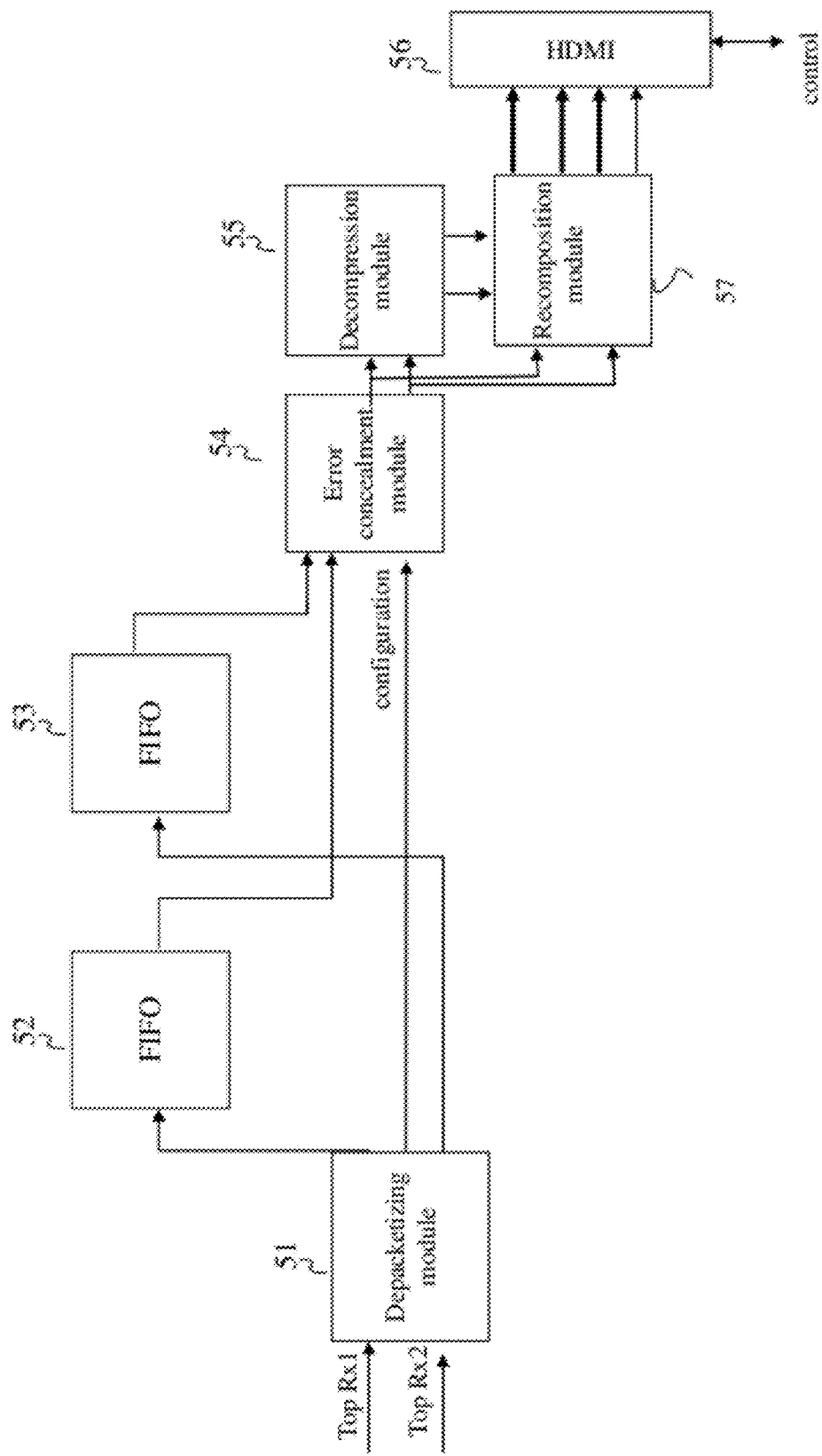
FIG. 5 is a schematic illustration of a second part of the synchronous communications controller devoted to the video reception according to one particular embodiment of the invention.

FIGS. 14A to 14D schematically illustrates different examples of error-concealment techniques, for different transmission schemes, implemented by the concealment module 54 of FIG. 5;

FIG. 15 schematically illustrates the process of compression and decompression according to the chromatic sub-sampling technique.

DETAILED DESCRIPTION

FIGS. 1A and 1B are a schematic illustration of two systems each implementing a particular embodiment of the invention.

FIGS. 1A and 1B are a schematic illustration of two systems each implementing a particular embodiment of the invention.

The first system, shown in FIG. 1A, comprises a video source device S and a video display device R. Each device has several radio interfaces. In this example, the two devices S and R are provided with two radio interfaces 18 and 19 to respectively communicate on two distinct channels. In this example, there are therefore two transmission paths referenced 4 and 5 between the two devices S and R, each path using a distinct radio channel. This system illustrates the use of several distinct radio channels in order to increase the bandwidth according to the bandwidth aggregation technique. It is assumed here below in the description that this first system is used to convey a video content without requiring a data compression of this video content.

The second system shown in FIG. 1B also has a source video device S and a video display device R. This device comprises a single radio interface 18. In this example, the two devices S and R are provided with a single radio interface 18 (they then use the same radio channel) to communicate on several distinct transmission trajectories. Each transmission trajectory is defined by a specific configuration of a sending antenna included in the source node and/or a reception antenna included in the destination node. In other words, each transmission trajectory corresponds to a transmission beam of distinct shape and/or a reception beam of distinct shape.

In this example therefore there are two transmission paths referenced 6 and 7 between the two devices S and R, each path using a distinct trajectory (and the same radio channel). It is assumed here below in the description that this second system does not enable the transportation of a video content without necessitating a compression of the data of this video content.

In each of the above-mentioned first and second systems, the video source device S comprises:
- media video server 1, such as for example a multimedia disk or a multimedia station type personal computer;
- a source node mc-S 10 capable of transferring the video according to the technique of an embodiment of the present invention to one or more 60 GHz radio channels;
- one or more 60 GHz radio interfaces 18, 19 for sending radio frames according to a TDMA (Time Division Multiple Access) type synchronous protocol.

In each of the above-mentioned first and second systems, the video display device R comprises:
- one or more 60 GHz radio interfaces 18, 19 for receiving radio frames according to the TDMA type synchronous protocol;
- a destination node mc-R 11 capable of receiving video according to the technique of an embodiment of the present invention on one or more 60 GHz radio channels;
- a very-high-resolution video display unit 3.

Each of the systems of FIGS. 1A and 1B furthermore comprises, as the case may be, other communications nodes (not shown). Access to the communications medium is then shared by all the nodes of the system. These other communications nodes can for example be designed for receiving the different audio channels (given by the mc-S source node 10) in a home cinema or home theater type system, each of these nodes being connected to a speaker designed to render its respective audio channel. These nodes thus participate, by meshing (as already mentioned) in the broadcasting of information such as information for controlling the network.

Figure 2:
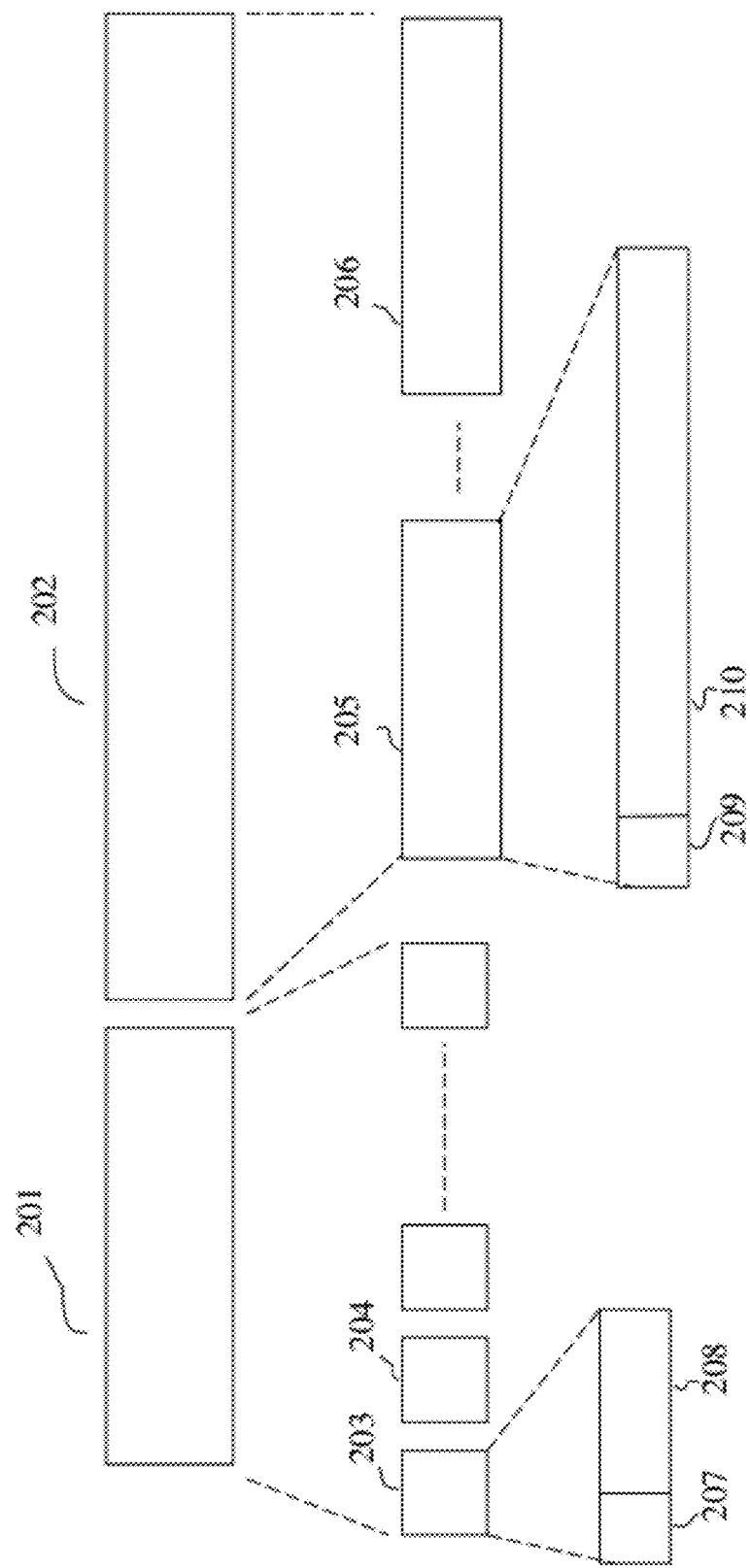
FIG. 2 illustrates an example of a TDMA type synchronous communication on a radio channel of a 60 GHz wireless communications network according to one particular embodiment of the invention.

FIG. 2 illustrates an example of a TDMA type synchronous communication on a 60 GHz wireless communications network radio channel such as for example one of the channels of FIG. 1A, according to one particular embodiment of the invention.

Access to the communications medium is thus governed by a clock rate (time-division access) known to all the nodes of the network.

According to one particular embodiment of the present invention, the management of the TDMA access is done by the source node mc-S 10 acting as master node, the other nodes of the network acting as slave nodes. The time is divided into data transmission cycles, also called SDTC (Synchronous Data Transmission Cycles). A superframe is transmitted at each cycle. A superframe is a sequence of frames for which the characteristics of length and the sender node are the same at each cycle. Any change in the sequence (new content to be transmitted, end of transmission of a content, . . . ) must be known to all the nodes. When starting, all the nodes work for example according to the predefined clock rate.

In the embodiment illustrated here below, the source node mc-S 10 manages the network access and the definition of the meshing schemes applicable to each radio channel. In one alternative embodiment, this network can be managed by any other node of the network. A meshing scheme is a representation of the distribution of access to the medium in each of the nodes of the network, furthermore giving a detailed account, among the data (or data blocks) transmitted on each of these nodes, of those data items that are data generated by this node and those that are data relayed by this node (as well as an indication of the original data to which they correspond).

A superframe according to one particular embodiment of the invention consists of a meshed part 201 corresponding to a set of meshed communications and a point-to-point part 202 corresponding to one or more point-to-point communications.

The meshed part 201 comprises frames 203, 204. These frames 203 and 204 are sent in broadcast mode by means of the radio interface 18 of the source node mc-S 10 (should this source node act as master), i.e. the sending antenna of the source node mc-S 10 (here in its function of master node) is in omnidirectional mode (isotropic antenna) or quasi-omnidirectional mode (according to a wide-angled sector, for example equal to 210 degrees). Each of the other nodes of the network is potentially a receiver of these frames and can relay them in the context of a meshing technique. The data is then relayed in omnidirectional mode.

The point-to-point part 202 comprises frames 205 and 206. These frames are sent in point-to-point or unicast mode by the radio interface of the nodes which transmit them or relay them. i.e., the respective sending antennas of the sending nodes are configured in directional mode. The directional mode concentrates the energy of the transmission on one or more target directions. The directional mode is used to convey data that cannot benefit from the meshing techniques, typically video data. Indeed, video data generally cannot benefit from the meshing technique because the quantities of data are too great to be repeated several times through the network. However, a restricted number of relaying actions (performed by the relay nodes) can be set up (depending on the deterioration permitted for video related to data compression in order to meet bandwidth constraints). Thus, several trains can be transmitted during the point-to-point period 202 for a same data stream.

The source node mc-S 10 (here in its master node function) sends the first frame 203 of each superframe and thus marks the start of the superframe.

The frames 203, 204 of the meshed part 201 consist of a header part 207 comprising a sender node identifier, and a payload part 208, comprising data.

The frames 205, 206 of the point-to-point part 202 are formed by a header part 209 comprising two pieces of information (a sender node identifier and a transmission scheme identifier (the notion of transmission scheme is described in detail here below with reference to FIG. 6)) and a payload part 210 comprising data.

Referring to FIG. 2, access to a first radio channel has been described here above. Access to a second radio channel is shared similarly, with a meshed part 201 and a point-to-point part 202, independently of the transmissions being made on the first radio channel.

Figure 3:
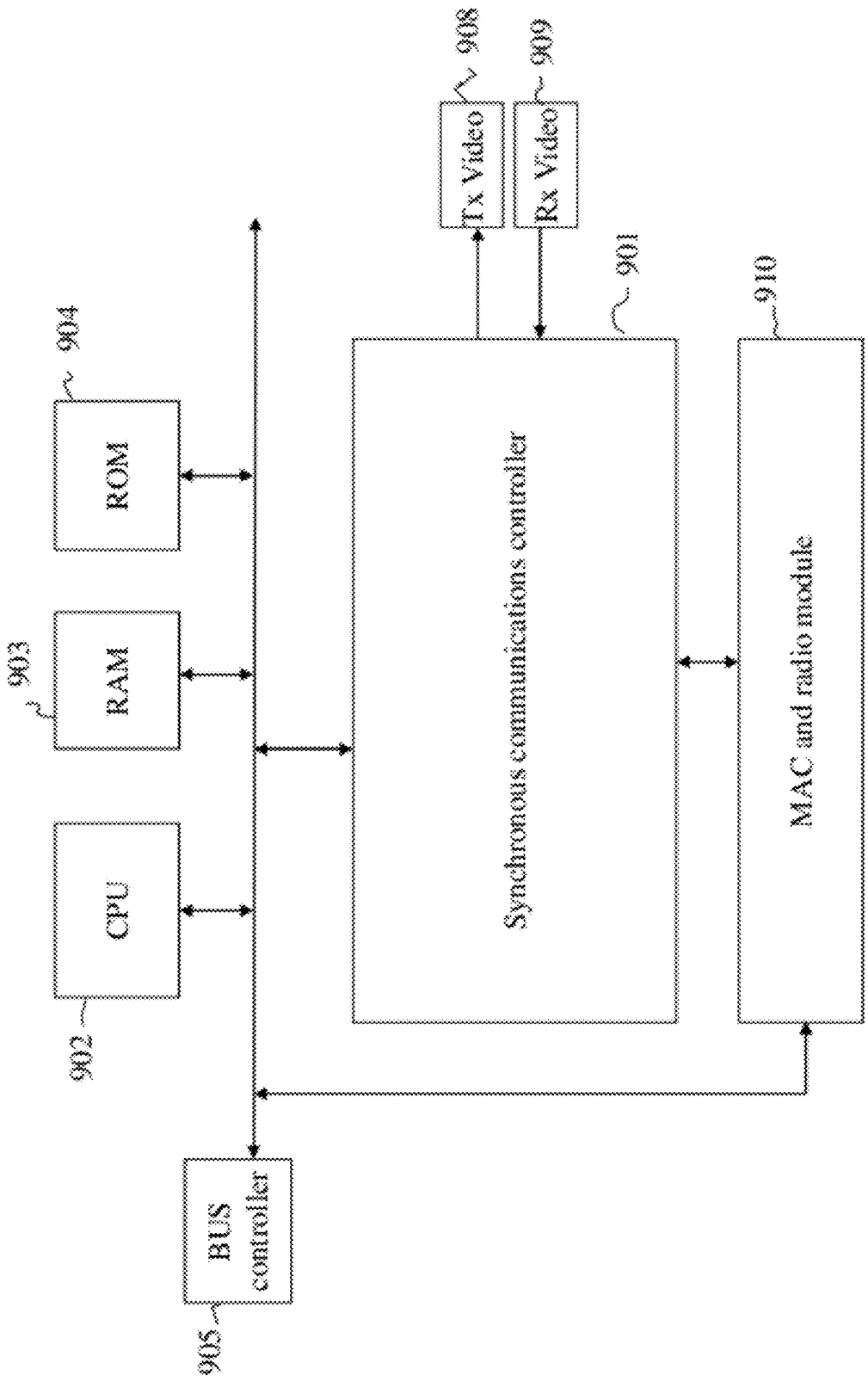
FIG. 3 is a block diagram of a communications node according to one particular embodiment of the invention.

FIG. 3 presents a block diagram of a communications node (source node mc-S-10 or destination node mc-R 11 of FIGS. 1A and 1B) according to one particular embodiment of the invention.

A communications node is built around a synchronous communications controller 901. The synchronous communications controller is linked to a CPU (central processing unit) 902, a RAM (random-access memory) 903 and a ROM (read-only memory) 904 through a bus governed by a bus controller 905.

After being powered on, the CPU 902 is capable of executing contained in the RAM 903 pertaining to a computer program once these instructions have been loaded from the ROM 904 or from an external memory (not shown in the present figure). A computer program of this kind, if executed by the computation unit 201, enables the execution of all or part of the steps of the algorithms of FIGS. 7 and 9 to 13.

In one alternative embodiment, these algorithms correspond to behavior and functions implemented in hardware form, in an FPGA ("Field Programmable Gate Array") or ASIC ("Application-Specific Integrated Circuit") type programmable component.

The synchronous communications controller is connected to applications interfaces 908 and 909. The pair of applications interfaces 908 and 909 implements a video output and input such as for example HDMI transceivers.

Finally, the synchronous communications controller is connected to a MAC/radio module enabling communications on one or more 60 GHz radio channels.

Figure 4:
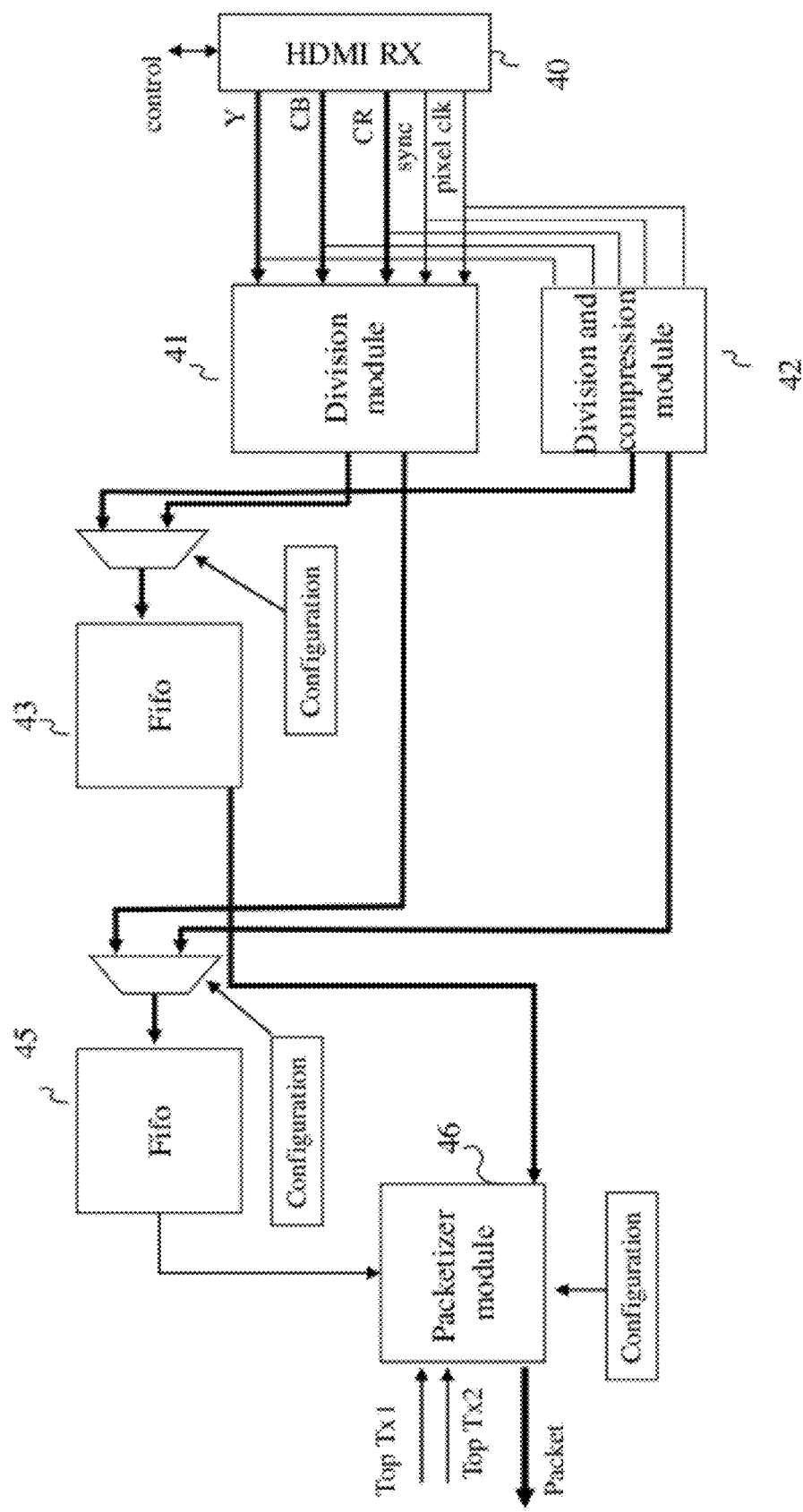
FIG. 4 is a schematic illustration of a first part of the synchronous communications controller devoted to the sending of video according to one particular embodiment of the invention.

The synchronous communications controller 901 is constituted by a first part and a second part, devoted respectively to sending and receiving video, described more extensively with reference to FIGS. 4 and 5.

FIG. 4 is a schematic illustration of the first part of the synchronous communications controller 901 devoted to the sending of video.

The video is acquired by means of an acquisition interface 40, for example of the HDMI (High Definition Multimedia Interface) type. The HDMI standard in its 1.4 version enables the acquisition of very high definition video (of the 4K2K type, i.e. with a resolution of 3840 (columns)×2160 (lines) for example).

The acquisition interface 40 is connected firstly to the division module 41 of the video and secondly to a compression module 42 of the video implementing for example the technique of chromatic sub-sampling. The interconnection signals between the acquisition interface 40 and the video processing modules 41 and 42 are:
  "Y": the luminance component;
  "Cb": the first chrominance component;
  "Cr": the second chrominance component;
  "Sync": signals for the vertical synchronization (Vsync) and horizontal synchronization (Hsync);
  "Pixel clock": pixel synchronization clock.

Furthermore, the acquisition interface has a control interface connecting it to the CPU 902 enabling especially the CPU unit 902 to obtain information on the resolution of the video under acquisition.

Once processed (either by the division module or by the division and compression module), the video is stored in the form of lines in two FIFO (First In First Out) type memories 43 and 45.

A packetizing module 46 forms packets ready to be transmitted by the MAC/radio communications module 910. The packets are formed according to:
  multi-channel configuration information (in the case of FIG. 1A) or multi-path configuration information on a same radio channel (in the case of FIG. 1B);
  transmission schemes defined by the CPU 902 (the notion of a transmission scheme is described in detail here below with reference to FIG. 6).

The MAC/radio communications module 910 sends the synchronous communications controller 901 at least two synchronization signals "Top TX 1" and "Top TX 2" which indicate the transmission opportunities.

For example (and as described in detail here below with reference to FIG. 11:

- if the system is in a multi-channel configuration, in a first variant, only the signal "Top TX 1" is used: the signal "Top TX 1" indicates an opportunity of transmission common to the two radio channels used, i.e. a transmission start instant for each of the two radio channels of a frame 205, 206 of the point-to-point part 202 of a superframe (see here above the description of FIG. 2). In other words, the signal "Top TX 1" indicates an instant of a start of simultaneous transmission on each of the two channels used;
- if the system is in a multi-channel configuration, in a second variant, the two signals "Top TX 1" and "Top TX 2" are used: the "Top TX 1" signal indicates a first opportunity of transmission on the first radio channel, i.e. a first instant of start of transmission of a frame 205, 206 of the point-to-point part 202 of a superframe transmitted on the first radio channel (see here above the description of FIG. 2); the signal "Top TX 2" indicates a second opportunity of transmission on the second radio channel, i.e. a second instant of a start of transmission of a frame 205, 206 of the point-to-point part 202 of a superframe transmitted on the second radio channel (see here above the description of FIG. 2). In other words, the signals "Top TX 1" and "Top TX 2" indicate two non-correlated instants relating to the start of transmission on the two radio channels;
- if the system is a single-channel configuration, the two signals "Top TX 1" and "Top TX 2" are used: the signal "Top TX 1" indicates a first opportunity of transmission on the unique radio channel, i.e. a first instant of a start of transmission of a frame 205, 206 of the point-to-point part 202 of a superframe transmitted on the single radio channel (see here above the description of FIG. 2); the signal "Top TX 2" indicates a second opportunity of transmission of the unique radio channel, i.e. a second instant of a start of transmission of another frame 205, 206 of the point-to-point part 202 of the above-mentioned superframe (transmitted on the single radio channel). In other words, the signals "Top TX 1" and "Top TX 2" indicate two successive instants of a start of transmission on a unique radio channel.

FIG. 5 is a schematic illustration of the second part of the synchronous communications controller devoted to the reception of video according to a particular embodiment of the invention.

The radio frames sent by the MAC/radio communications module 910 of the source node mc-S 10 using data packets generated by the packetizing module 46 are received by the MAC/radio module 910 of the mc-R destination node 11. A de-packetizing module 51 is then used to extract video lines from the received radio packets. These video lines are then stored in two FIFO type memories 52 and 53.

Then, the video lines are corrected to the extent possible by an error concealment module 54 and decompressed if necessary (depending on whether the example is that of FIG. 1A or in that of FIG. 1B) by a decompression module 55. Finally, the lines are combined by the recomposition module 57 in order to refresh the video stream to the state it had been before it was divided by the source node mc-S 10. Once recomposed, the lines are sent to a display interface 56, for example an HDMI type interface.

The MAC/radio communications module 910 sends the synchronous communications controller 901 at least two synchronization signals "Top RX 1" and "Top RX 2" indicating a reception opportunity.

For example, (and as described in detail here below with reference to FIGS. 12 and 13):

- if the system is in a multiple-channel configuration, in the first variant mentioned here below, only the signal "Top RX 1" is used: the signal "Top RX 1" indicates a reception opportunity common to the two radio channels used, i.e. an instant of a start of reception for each of the two radio channels of a frame 205, 206 of the point-to-point part 202 of a superframe (see here below the description of FIG. 2). In other words, the signal "Top RX 1" indicates an instant of a start of simultaneous reception on each of the two channels used;
- if the system is in a multiple-channel configuration, in the second variant mentioned here above, the two signals "Top RX 1" and "Top RX 2" are used: the signal "Top RX 1" indicates a first opportunity of reception through the first radio channel, i.e. the first instant of a start of reception of a frame 205, 206 of the point-to-point part 202 of the superframe transmitted on the first radio channel (see here above the description of FIG. 2); the signal "Top RX 2" indicates a second opportunity of reception through the second radio channel, i.e. a second instant of a start of reception of a frame 205, 206 of the point-to-point part 202 of a superframe transmitted on the second radio channel (see here above the description of FIG. 2). In other words, the signals "Top RX 1" and "Top RX 2" indicate two non-correlated instants of a start of reception on the two radio channels;
- if the system is in a single-channel configuration, the two signals "Top RX 1" and "Top RX 2" are used: the signal "Top RX 1" indicates a first opportunity of reception on the single radio channel, i.e. a first instant of a start of reception of a frame 205, 206 of the point-to-point part 202 of a superframe transmitted on the single radio channel (see here above the description of FIG. 2); the signal "Top RX 22 indicates a second opportunity of reception on the single radio channel, i.e. a second instant of a start of reception of another frame 205, 206 of the point-to-point part 202 of the above-mentioned superframe (transmitted on the single radio channel). In other words, the signals "Top RX 1" and "Top RX 2" indicate two successive instants of a start of reception on a single radio channel.

FIG. 6 illustrates different video line transmission schemes according to one particular embodiment of the invention.

To illustrate the different configurations of FIG. 6, the description is situated in the case where the FIFO type memories 43 and 45 have a fixed fill threshold set at 20 lines. A fill threshold in a FIFO type memory is used to defer reading up to the filling of the memory up to said threshold. This enables an absorption of possible variations in the fill rate of said FIFO type memory.

First Transmission Scheme S1 (Transmission Scheme S1):

When the system has two radio interfaces 18, 19 enabling communication on both independent radio channels (the case of FIG. 1A), the CPU 902 selects a first transmission scheme (transmission scheme S1). In this first scheme, an incoming video is divided into two videos, here below called "right-hand video" and "left-hand video". This division is done at the image level: each image of the incoming video is divided into two half images (each line is cut in the middle into two equal parts).

Then packets are formed for the transmission on both paths. The packets P1 transmitted on the first part contain an alternation of even-parity lines of the left-hand video and odd-parity lines of the right-hand video. Conversely, the packets P2 transmitted on the second path contain an alternation of odd-parity lines of the left-hand video and even-parity lines of the right-hand video.

The term even-parity (or odd-parity) line denotes an even-parity (or odd-parity respectively) indexed line, the lines of an image being indexed according to a predefined sequence according to their position in the image. For example, for an image with 2160 lines, the image is traversed from top to bottom, the index 0 corresponding to the topmost line of the image and the index 2159 corresponding to the bottom-most line of the image.

When the system has only one radio interface 18 available to it, used to communicate on two paths each using a distinct trajectory (the case of FIG. 1B), the incoming video is also divided into two videos, here below called "right-hand video" and "left-hand video" comprising half images. An additional step is then used to compress each half image of the right-hand and left-hand videos, for example according to a chromatic sub-sampling technique (described in detail here below with reference to FIG. 15). Then, for each half image, we obtain L1 type compressed lines and L2 type compressed lines. In this technique, the L1 type lines comprise a succession of pixels with chrominance information and pixels without chrominance information. The L2 type lines comprise solely pixels without chrominance information. The L1 type lines therefore contain twice as much information as the L2 type lines.

The source node mc-S 10 then sends the L1 and L2 type compressed lines on the two transmission paths. The different transmission schemes (transmission schemes S2 to S6) which can be applied in this case depend on the quality of transmission on the two paths. They are described in detail successively here below.

Second transmission scheme (transmission scheme S2): it is used if the quality of transmission is substantially identical on both paths (for example if it is good, i.e. greater than or equal to a predetermined threshold on both paths). In this case, the packets P1 transmitted on the first path contain an alternation of L1 type lines of the right-hand video and L2 type lines of the left-hand video. The packets P2 transmitted on the second path contain an alternation of L1 type lines of the left-hand video and L2 type lines of the right-hand video.

The packets P1 and P2 comprise for example ten lines each and are written as follows:

$$P1=10*L1_{FIFO\text{-}right}+10*L2_{FIFO\text{-}left}$$

$$P2=10*L2_{FIFO\text{-}right}+10*L1_{FIFO\text{-}left}$$

Third transmission scheme (transmission scheme S3): used if the quality of transmission on the second path is better than it is on the first path. In this case, the packets P1 transmitted on the first path contain an alternation of L2 type lines of the right-hand video and L2 type lines of the left-hand video. The packets P2 transmitted on the second path contain an alternation of L1 type lines of the left-hand video and L1 type lines of the right-hand video. For reasons of packet size, the alternation relates to only 50% of the L1 type lines of the right-hand video. In other words, when the FIFO type memory containing the right-hand video is read, only one in two L1 type lines is transmitted, the other one being removed out of the memory read.

The packets P1 and P2 comprise for example 20 lines and 15 lines respectively each and can be written as follows:

$$P1=10*L2_{FIFO\text{-}right}+10*L2_{FIFO\text{-}left}$$

$$P2=5*L1_{FIFO\text{-}right}+10*L1_{FIFO\text{-}left}$$

Fourth transmission scheme (transmission scheme S4): it is used if the first path is inoperative. In this case, no packet P1 is transmitted on the first path. The packets P2 transmitted on the second path contain an alternation of L1 type lines of the left-hand and right-hand videos and l2 type lines of the left-hand and right-hand video. For reasons of packet size, the alternation relates to only 25% of the L1 type lines of the left-hand and right-hand videos. In other words, when each of the FIFO type memories is read (one containing the right-hand video and the other containing the left-hand video), only one L1 type line in four is taken. The other lines are removed out of the memory read.

The packets P2 comprise for example 25 lines and the following two types of packets are sent alternately (because 25%*10 lines do not give an integer number of lines):

$$P2=3*L1_{FIFO\text{-}right}+10*L2_{FIFO\text{-}right}+2*L1_{FIFO\text{-}left}+10*L2_{FIFO\text{-}left}$$

$$P2=2*L1_{FIFO\text{-}right}+10*L2_{FIFO\text{-}v}+3*L1_{FIFO\text{-}left}+10*L2_{FIFO\text{-}left}$$

Fifth transmission scheme (transmission scheme S5): this is the case symmetrical to the transmission scheme S3. It is used if the quality of transmission on the first path is better than that of the second path. The packets P1 transmitted on the first path contain an alternation of L1 type lines of the left-hand video and L1 type lines of the right-hand video. The packets P2 transmitted on the second path contain an alternation of L2 type lines of the right-hand video and L2 type lines of the right-hand video. For reasons of packet size, the alternation pertains to only 50% of the L1 type lines of the left-hand video. In other words, when the FIFO type memory containing the left-hand video is read, only one L1 type line in two is taken, the other being removed out of the memory read.

Sixth transmission scheme (transmission scheme S6): this case is symmetrical to the transmission scheme S4. It is used if the second path is inoperative. In this case, no packet P2 is transmitted on the second path. The packets P1 transmitted on the first path are identical to those transmitted on the second path in the case of the transmission scheme S4.

FIG. 7 is a flowchart of an example of an algorithm for selecting a transmission scheme among those described with reference to FIG. 6.

In a step 701, the CPU 902 obtains the resolution of the video stream as described by the acquisition interface 40 through its control interface as defined by the HDMI standard.

Then, in a step 702, the CPU 902 obtains a piece of information on radio configuration (indicating whether one or more radio interfaces 18, 19 are used), in order to determine whether the configuration is a single-channel configuration (only one radio interface 18 is used) or a multi-channel configuration (several radio interfaces 18, 19 are used).

Then, in a step 703, the information on radio configuration is tested.

If the system is in a multiple-channel configuration, then a step 711 enables the CPU 902 to deactivate the compression module 42 of FIG. 4.

Then, in a step 712, the CPU 902 initializes the packetizing module 46 to form packets according to the transmission scheme S1 of FIG. 6.

If the system is in a single-channel configuration (the test being negative at the step 703), then the CPU 902 activates the compression module 42 in a step 704.

Then, in a following step 705, the CPU 902 initializes the packetizing module 46 to form packets according to the transmission scheme S2.

Then, in a following step 706, the CPU 902 goes into a state of waiting for information from the communications interface (through the control bus managed by the bus controller 905).

During following tests, the CPU analyses the network information in order to dynamically modify the transmission scheme.

Thus, if the pieces of information indicate a deterioration of one of the two paths in a step 707, then in a following step 708, the CPU 902 applies the transmission scheme S3 if only the first path gets deteriorated, or else the transmission scheme S5 if only the second path gets deteriorated.

If the information does not indicate deterioration of one of the two paths in a step 707, then a step 709 is used to ascertain that one of the two paths is cut, for example because of a permanent shadowing, and is therefore inoperative.

If it turns out to be the case that one of the two paths is inoperative (positive test at the step 709), then in a step 710 the CPU 902 applies the transmission scheme S4 if it is the first path that is cut or else the transmission scheme S6 if it is the second path that is cut.

If it turns out that neither of the two paths is cut (with a negative test at the step 709), then the CPU 902 applies the transmission scheme S2.

FIG. 8 schematically illustrates the format of the video lines during their storage in their FIFO type memories 43 and 45, according to a particular embodiment of the invention.

A line is constituted by a header field 80 and a pixel field 84. The pixel field 84 groups together the pixels of the line (the data). The header 80 contains:
- a piece of information 81 on "status" providing information on the state of the lines, i.e. whether compressed, non-compressed (raw) or lost;
- a piece of information 82 on size providing information on the size of a line in number of bytes;
- a piece of information 83 providing information on the number (index) of the line in the image.

FIG. 9 is a flowchart of an example of an algorithm describing the working of the module 41 for dividing the video stream.

At a step 301, the division module 41 gets synchronized with a vertical synchronization signal Vsync indicating a new image. A line counter "line num" and a pixel counter "pixel num" are set at 0.

Once the vertical synchronization Vsync has been detected, then in a step 302, the division module 41 describes a line header in each FIFO type memory 43 and 45 with:
"line number"="line counter";
"status"="no compression";
"size"="configuration by the CPU".

Then, the division module 41 awaits a leading edge of the pixel clock signal in a step 303.

Once the leading edge of the pixel clock signal has been detected the pixel counter "pixel num" is tested relative to half of the line in a step 304.

If the pixel is on the left-hand part of the image, then in a step 305, the division module 41 validates the output enabling the transfer of lines to the FIFO type memory 43.

If the pixel is on the right-hand half of the image, then in a step 306, the division module 41 validates the output enabling a transfer of lines to the FIFO type memory 45.

In a following step 307, the pixel is stored in the FIFO type memory 43 or 45 (depending on the output validated at the previous step) and the pixel counter "pixel num" is incremented.

Then, in a step 308, the pixel counter "pixel num" is tested relative to the end of line.

If this is not the last pixel of the line, then the division module 41 loops back to the step 303 of waiting for the leading edge of the pixel clock signal. If not, this is the last pixel of the line and then the division module 41 passes into a state of waiting for the horizontal synchronization signal Hsync in a step 309. At this step 309, the pixel counter "pixel num" is reset at the value 0.

Once the horizontal synchronization Hsync has been detected, then in a step 310 the line counter "line num" is tested relatively to the number of lines of the image.

If this is not the last line of the image, then the line counter "line num" is incremented and the division module 41 loops back to the step 303 waiting for the leading edge of the pixel clock signal.

If it is the last line of the image, then the division module 41 loops to the step 301 of waiting for the vertical synchronization Vsync.

Figure 10:
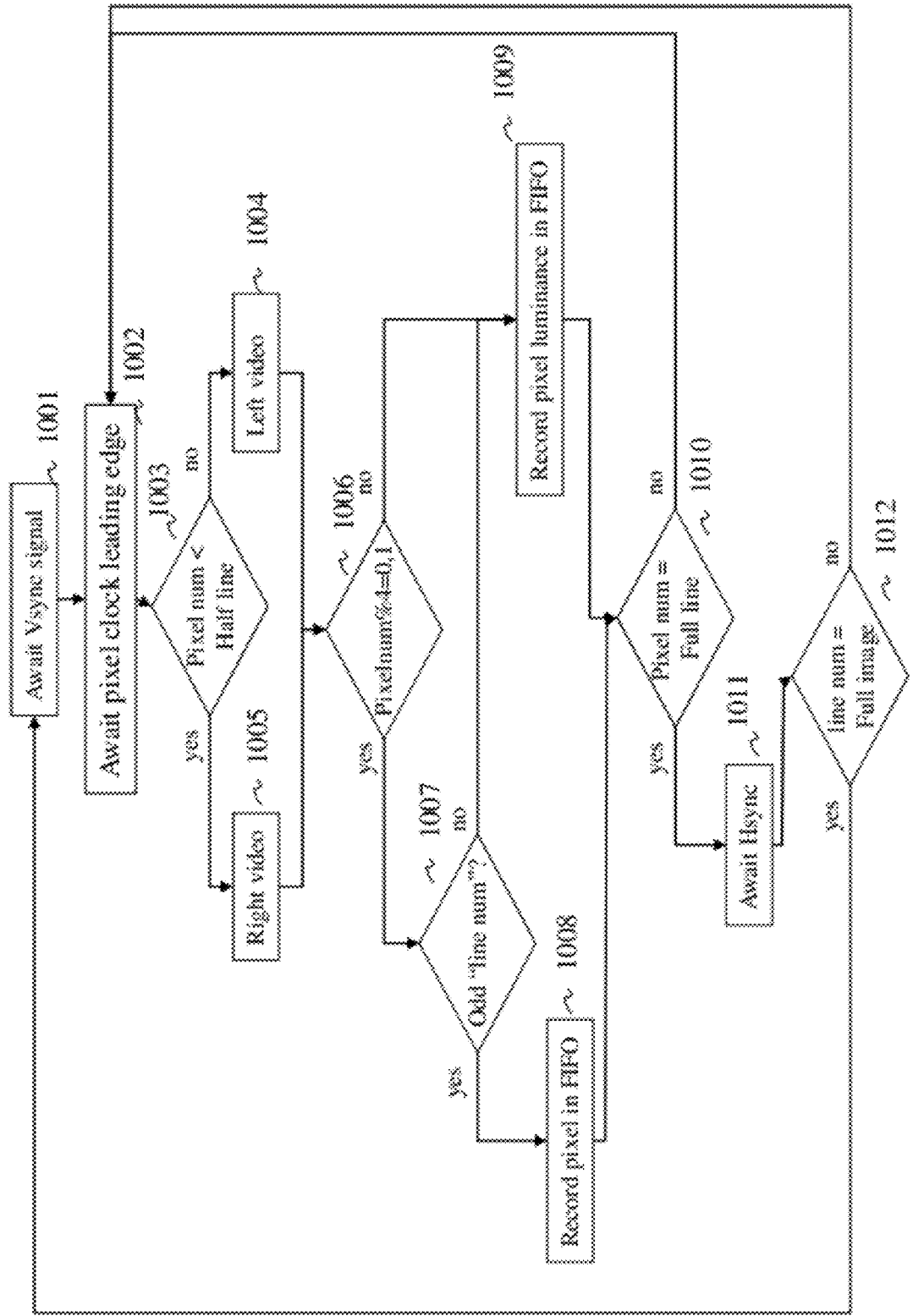
FIG. 10 is a flowchart of an example of an algorithm describing the working of the compression module 42.

FIG. 10 is a flowchart of an example of an algorithm describing the working of the compression module 42 according to the particular (but non-restrictive) example of a compression mode 4:4:4 to 4:2:0.

At a step 1001, a compression module 42 gets synchronized with the vertical synchronization signal Vsync indicating a new image. A line counter "line num" and a pixel counter "pixel num" are set at 0.

Once the vertical synchronization Vsync has been detected, the compression module 42 writes a line header in each FIFO type memory 43 and 45 with:
the line number in the line counter ("line num");
the "compression" value in a status field;
a configuration value (given by the CPU 902) in a "size" field.

Then, the compression module 42 awaits a pixel clock signal leading edge in a step 1002.

Once the pixel clock signal leading edge has been detected, in a step 1003, the pixel counter ("pixel num") is tested relative to half of the line.

If the pixel is on the left-hand half of the image (negative test at the step 1003), the compression module 42 validates the output of the FIFO type memory 43 in a step 1004.

If the pixel is on the right-hand half of the image (test positive at the step 1003), the compression module 42 validates the output of the FIFO type memory 45 in a step 1005.

Then, the pixel counter ("pixel num") is again tested in a step 1006, this time with reference to the rest of the integer division by 4.

If the rest of the division possesses a value ranging between two and three, then in a step 1005, it is only the component Y of the pixel that is stored in the FIFO type memory 43 or 45 selected at the step 1003.

If the rest of the division has a value ranging between zero and one, then the line counter ("line num") is tested on its parity in a step 1007.

If the line number is of the even-parity type then a step 1008 enables the storage of the pixel as such in the FIFO type memory 43 or 45 selected at the step 1003.

If the line number is of an odd-parity type, then the step 1005 is executed where the only component stored is the component Y of the pixel in the FIFO type selected memory 43 or 45 in the step 1010.

Then the pixel counter ("pixel num" is tested relatively to the line end in a step 1010.

If this is not the last pixel of the line, then the compression module 43 loops back to the step 1002 of waiting for the leading edge of the pixel clock signal. At this step, the pixel counter is incremented.

If not, if it is the last pixel of the line, then the compression module 42 passes to a state of waiting for the horizontal synchronization signal Hsync in a step 1011.

Once the horizontal synchronization Hsync has been detected, the line counter ("line num") is tested relative to the end of image in a step 1012.

If this is not the last line of the image, then the line counter is incremented and the compression module 42 loops back to the step of waiting for the leading edge of the pixel clock signal. At this step, the pixel counter gets reset at the value 0.

If it is the last line of the image, then the compression module 42 loops to the state of waiting for vertical synchronization signal Vsync (step 1001).

Figure 11:
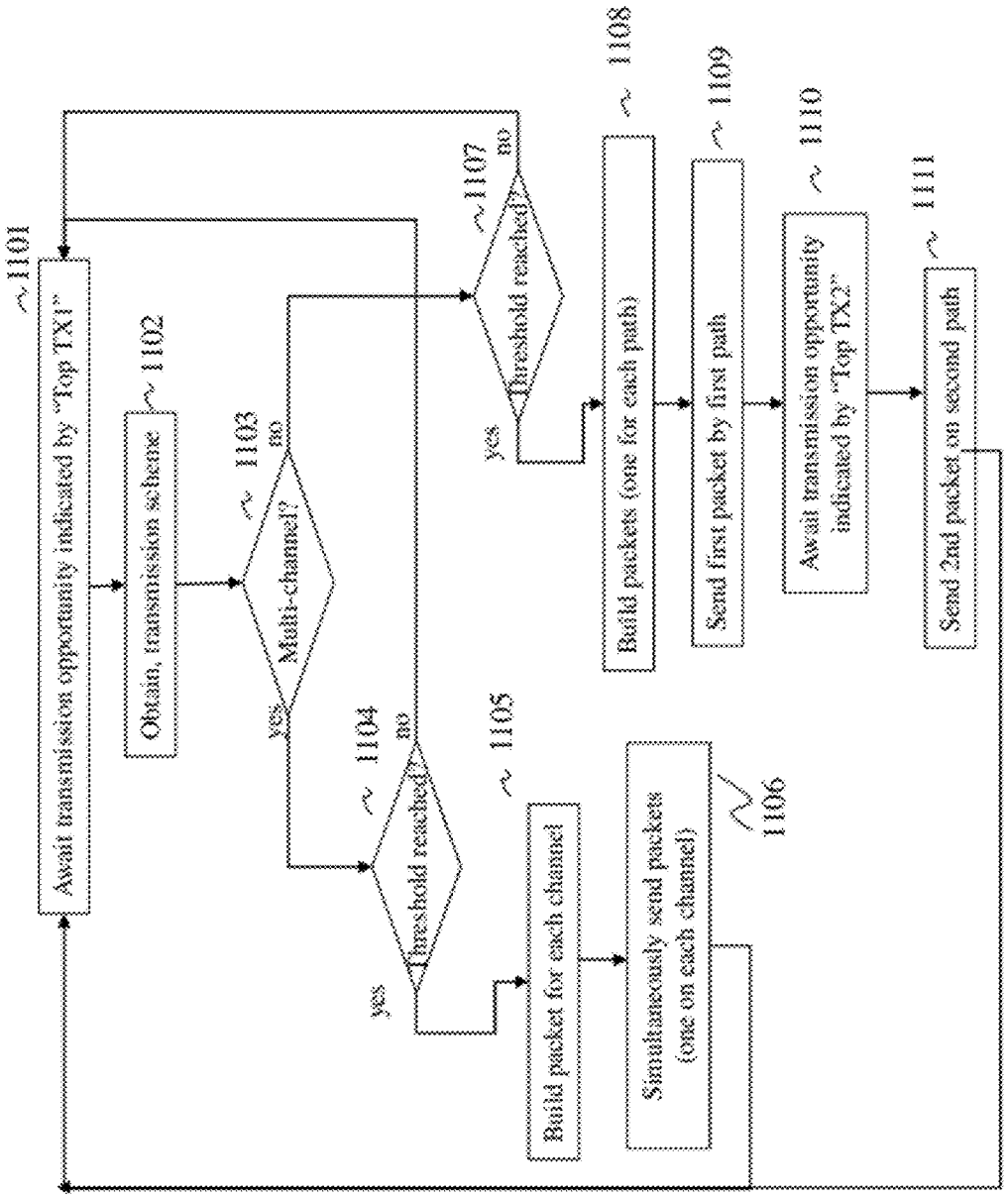
FIG. 11 is a flowchart of an example of an algorithm describing the working of the packetizing module 46.

FIG. 11 is a flowchart of an example of an algorithm describing the working of the packetizing module 46.

During a step 1101, the packetizing module 46 awaits a first opportunity of transmission indicated by the signal "Top TX1" coming from the MAC/radio communications module 910.

Once the first transmission opportunity has been received, the packetizing module 46, in a step 1102, obtains the transmission scheme as defined by the CPU 902.

Then, a following step 1103 is used to determine whether the system (to which the source node ms-C 10 containing the packetizing module 46 belongs) is in a single-channel configuration (the case of FIG. 1B) or a multi-channel configuration (the case of FIG. 1A).

In a multi-channel configuration (i.e. if the result of the test of the step 1103 is positive), then the packetizing module 46, in a step 1104, tests the fill level of the FIFO type memories 43 and 45. For example, for a resolution of twice 1080 p and for a bit rate of 60 Gbps per radio channel, the fill threshold of the FIFO type memories 43 and 45 is 20 lines.

If the fill threshold of the FIFO type memories 43 and 45 is not reached, then the packetizing module 46 loops back to the step 1101 of waiting for a first opportunity of transmission indicated by the signal "Top TX1".

If the fill threshold is reached, then the packetizing module 46, in a step 1105, and according to the transmission scheme S1 of FIG. 6, builds a first packet in alternating ten even-parity lines of the FIFO type memory 43 and ten odd-parity lines of the FIFO type memory 45 and a second packet in alternating ten odd-parity lines of the FIFO type memory 43 and ten even-parity lines of the FIFO type memory 45. In the header of each packet, the module indicates the transmission scheme S1.

Then, in a step 1106, these first and second packets are transmitted to the MAC/radio communications module 910 for simultaneous sending (each of the two packets is transmitted on a distinct radio channel).

Then, the packetizing module 46 loops back to the step 1101 of waiting for a first opportunity of transmission indicated by the signal "Top TX1".

In a single-channel configuration (i.e. if the result of the test of the step 1103 is negative), then the module, in a step 1107, tests the fill level of the FIFO type memories 43 and 45. For example, for a resolution of twice 1080 p and for a bit rate of 3 Gbps, the fill threshold of the FIFO type memories 43 and 45 is 20 lines.

If the fill threshold of the FIFO type memories 43 and 45 is not reached, then the packetizing module 46 loops back to the step 1101 of waiting for a first opportunity of transmission indicated by the signal "Top TX1".

If the fill threshold of the FIFO type memories 43 and 45 is reached, the packetizing module 46, in a step 1108, builds two packets by alternating the lines according to any one of the transmission schemes S2 to S6 defined by the CPU 902. In the header of each packet, the packetizing module 46 indicates the transmission scheme used.

Then, in a step 1109, the first packet is transmitted to the MAC/radio communications module 910 for sending on the first path.

The packetizing module 46 then waits for a second opportunity of transmission indicated by the signal "Top TX2" in a step 1110.

Then, in a step 1111, the second packet is transmitted to the MAC/radio communications module 910 to be sent on the second path.

Then, the packetizing module 46 loops back to a step 1101 of waiting for a first opportunity of transmission indicated by the signal "Top TX1".

Figure 12:
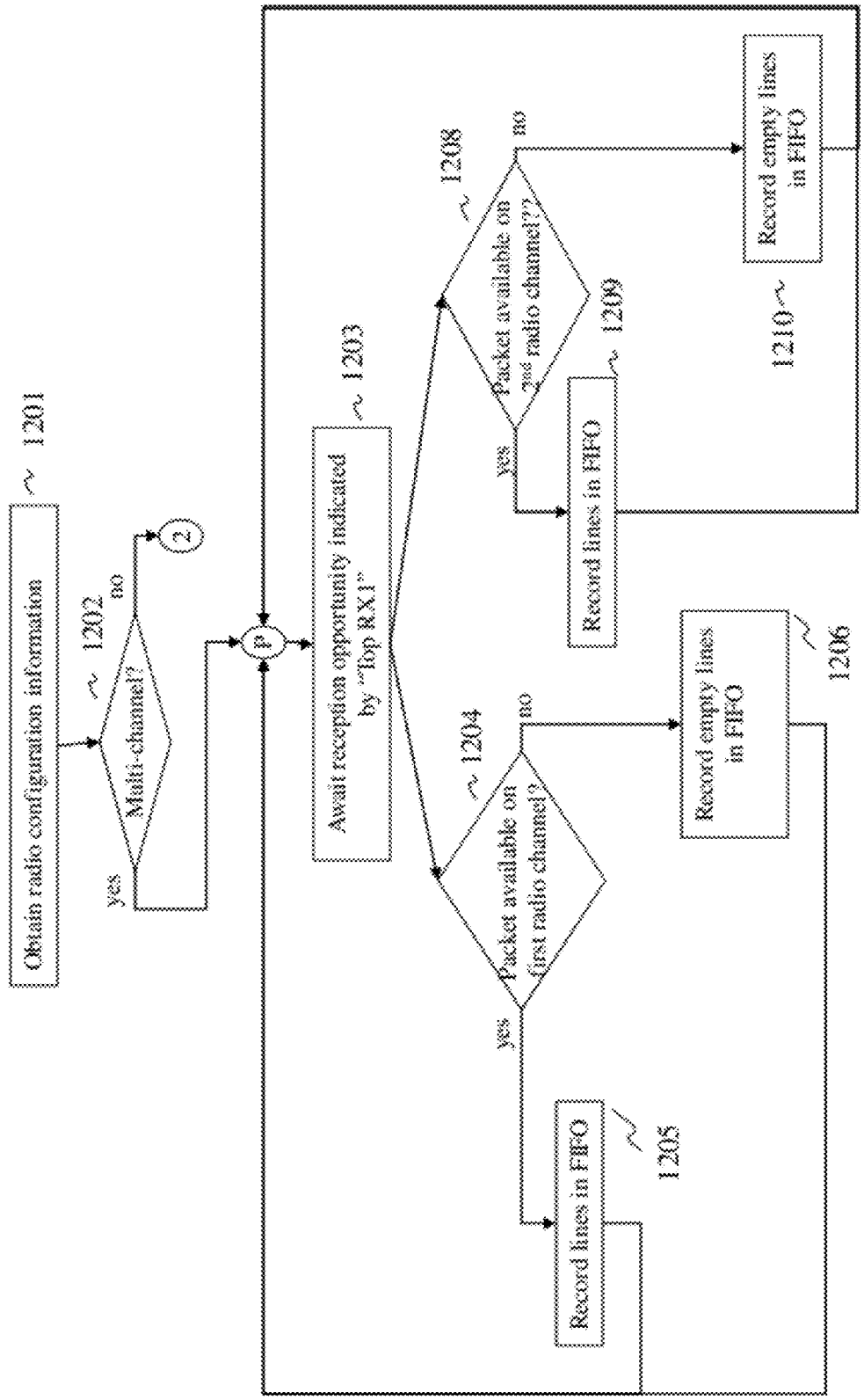

FIGS. 12 and 13 are a flowchart of an example of an algorithm describing the working of the depacketizing module 51.

At a step 1201, the depacketizing module 51 obtains a piece of information on radio configuration in order to determine whether the system (to which the destination node mc-R destination node 11 containing the depacketization module 51 belongs) is in a single-channel configuration (the case of FIG. 1B) or a multiple-channel configuration (the case of FIG. 1A).

Then, in a step 1202, the information on radio configuration is tested.

In a multi-channel configuration (i.e. if the result of the test of the step 1202 is positive), then the depacketizing module 51 awaits a first reception opportunity (through the radio interface 18 associated with the first channel) in a step 1202, this opportunity being indicated by the signal "Top RX1".

Then (after detection of the first reception opportunity), two arms of the flowchart of FIG. 12 are executed in parallel.

On a first arm, the depacketizing module 51 tests to see whether a packet is received through the radio channel in a step 1204. If a packet is received, then in a step 1205 the depacketizing module 51 obtains the transmission scheme (in reading the header of the packet) and stores the video lines in the two FIFO type memories 43 and 45 as defined by the selected transmission scheme (default transmission scheme S1). If no packet is received, then the depacketizing module 51, in a step 1206, stores empty lines in the two FIFO type memories 43 and 45 according to the transmission scheme S1. An empty line is characterized by a pixel field 84 which is devoid of pixels and a header 80 whose status field 81 is of the missing type.

On a second arm, the depacketizing module 51 tests to see if a packet has been received through the second radio channel, in a step 1208. If a packet is received then, in a step 1209, the depacketizing module 51 obtains the transmission scheme (in reading the header of the packet) and stores the video lines in the two FIFO type memories 43 and 45 as defined by the selected transmission scheme (default transmission scheme S1). If no packet is received, then the depacketizing module 51, in a step 1210, stores video lines in the two FIFO type memories 43 and 45 as a function of the transmission scheme S1.

In a single-channel configuration (i.e. if the result of the test of the step 1202 is negative) then the operation passes to the part of the algorithm described by FIG. 13.

In a step 1301, the depacketizing module 51 awaits a first opportunity of reception (through the radio interface 18 associated in this case with the single radio channel) indicated by the signal "Top RX1".

Once this first opportunity of reception has been detected, the depacketizing module 51 in a step 1302 tests to see if a packet has been received through the single radio channel.

If a packet has been received, then in a step 1303, the transmission scheme is obtained by reading the packet header. Then, in a step 1304, the lines are stored in the two FIFO type memories 52 and 53 as defined by the transmission scheme selected from among one of the transmission schemes S2 to S6 of FIG. 6.

If there is no packet received through the single radio channel (negative test at the step 1302), then the depacketizing module 51, in a step 1305, stores empty lines according to the last known transmission scheme or else according to the transmission scheme S2.

After the step 1304 or the step 1305, in a step 1306 the depacketizing module 51 goes into a state of waiting for a second reception opportunity (through the radio interface 18 associated in this case with the single radio channel) indicated by the signal "Top RX2".

Once this second reception opportunity has been detected, the depacketizing module 51, in a step 1307, tests to see whether a packet has been received through the single radio channel.

If a packet is received, then the transmission scheme is obtained in a step 1308 by the reading of the packet header. Then, in a step 1309, the lines are stored in the two FIFO type memories 52 and 53 as defined by the selected transmission scheme.

If there is no packet received through the single radio channel (negative test at the step 1307) then, in a step 1310, the depacketizing module 51 stores empty lines according to the last known transmission scheme or else according to the transmission scheme S2.

FIGS. 14A to 14D provide a schematic illustration, for different transmission schemes, of different examples of error concealment techniques implemented by the concealment module 54 of FIG. 5.

FIG. 14A corresponds to the case of the transmission scheme S1 of FIG. 6 (without compression). Following the loss of packets on one of the two radio channels, the empty lines will be interposed with valid lines in the two FIFO type memories 52 and 53. These empty lines are represented in the drawing with a hashed texture. When a line is empty, the error concealment module 54 replaces it with a directly neighboring line (above or below).

FIG. 14B corresponds to the case of the transmission scheme S2 of FIG. 6. Following the loss of packets on one of the two paths, video lines will be interposed with L1 or L2 type valid lines in the two FIFO type memories 52 and 53. These empty lines are represented in the drawing with a hashed texture. When a line is empty, the error concealment module 54 replaces it with a directly neighboring line (above or below).

Figure 14C:
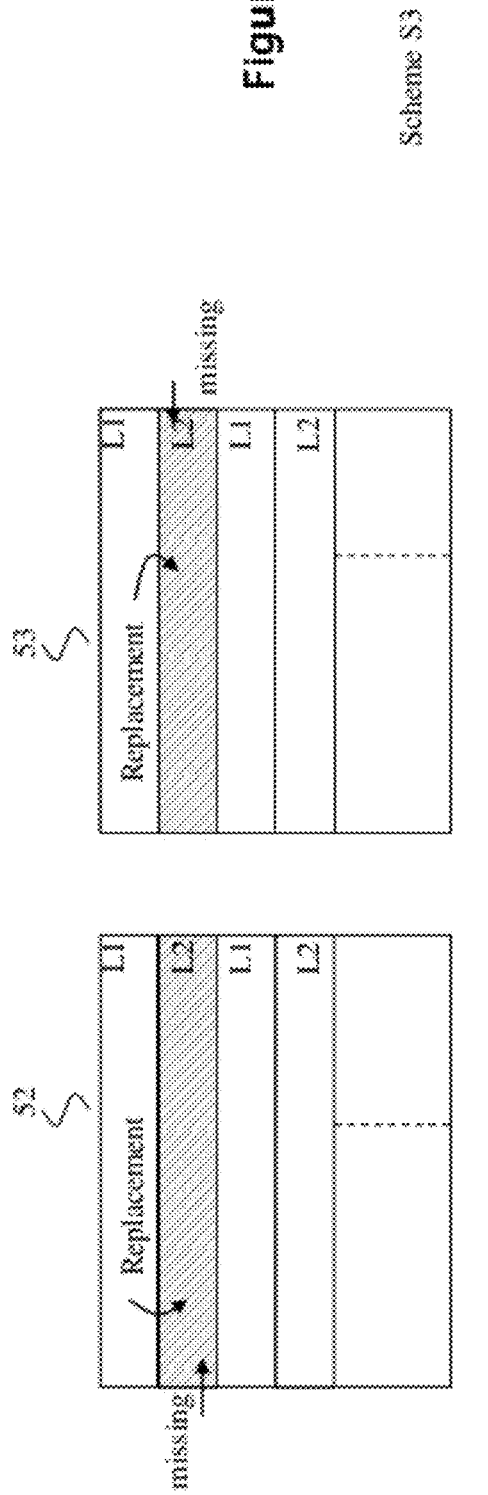

FIG. 14C corresponds to the case of the transmission scheme S3 of FIG. 6 showing packet losses on the first path. Following the loss of packets on the first path, L2 type lines are empty in the two FIFO type memories 52 and 53. These lines are represented in the scheme with a hashed texture. When an L2 type line is empty, the error concealment module 54 replaces it with an L1 type line which is a directly neighboring line in taking care to ensure that the choice (upper low or lower line) is the same for the two FIFO type memories 52 and 53.

Figure 14D:
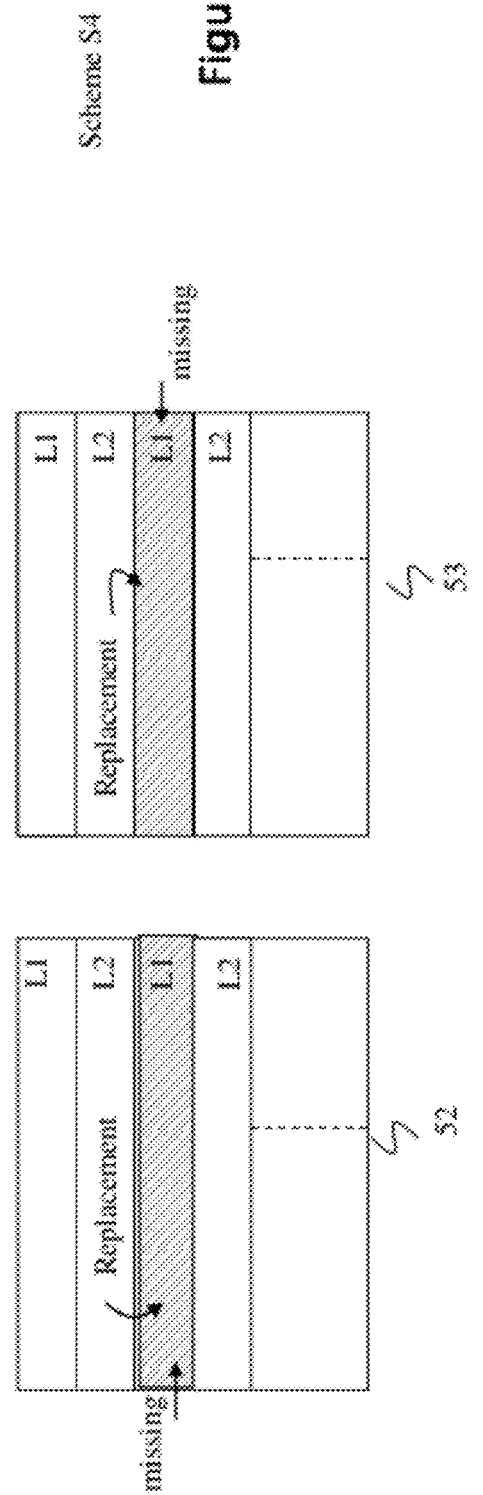

FIG. 14D corresponds to the case of the transmission scheme S4 of FIG. 6 representing the case where the first path is cut. In this case, three L1 type lines out of four are empty in the two FIFO type memories 52 and 53. These lines are represented in the scheme in a hashed texture. When an L1 type line is empty, the error concealment module 54 replaces it with an L2 type line that is a direct neighbor in taking care to ensure that the choice (line above or line below) is the same for the two FIFO type memories 52 and 53.

The transmission scheme S5 is symmetrical with the transmission scheme S3 and the transmission scheme S6 is symmetrical with the transmission scheme S4. They are therefore respectively processed in the same way as the transmission schemes S3 and S4.

FIG. 15 is a schematic illustration of the process of compression and decompression according to the technique of chromatic sub-sampling.

More particularly, FIG. 15 illustrates the passage from a full 4:4:4 image to a compressed 4:2:0 image (compression phase) and then a return to a full 4:4:4 image (decompression phase).

The passage from a full 4:4:4 image to a compressed 4:2:0 image is got by eliminating the chromatic information Cb and Cr from three out of four pixels in a square between two lines. A first technique lies in keeping only the value Cb and Cr of one pixel out of four as described with reference to FIG. 10. A more developed technique replaces the value Cb and Cr of one pixel in four by the average of the values of Cb and Cr of the four pixels.

The reverse passage from 4:2:0 to 4:4:4 is obtained by copying out the value Cb and Cr from one pixel in four to the other three pixels.

An embodiment of the invention provides a technique for transmitting one or more contents (for example of a video type) on several transmission paths between source nodes and destination nodes, this technique making the transportation of the content or contents more reliable.

An embodiment of the invention provides a technique of this kind that is compatible with classic compression techniques, such as for example the technique of compression by chromatic sub-sampling.

An embodiment of the invention provides a technique of this kind for homogeneously distributing possible defects of display (on a screen) resulting from disturbances on at least one of the transmission paths.

An embodiment of the invention provides a technique of this kind for simply carrying out error concealment in the destination node.

An embodiment of the invention provides a technique of this kind that is simple to implement and costs little.

The invention claimed is:

1. A method for transmitting at least first and second video streams, each comprising images, by means of a source node to a destination node via at least first and second transmission paths, said method for transmitting comprising steps of:
   sub-dividing each of said first and second video streams into a succession of image lines;
   selecting a transmission scheme as a function of at least one piece of information on quality of transmission on at least one of the paths, said transmission scheme defining, for each path, a predetermined alternation of several lines of the first video stream and several lines of the second video stream; and
   transmitting, on at least one of said paths, packets of lines each packet comprising the predetermined alternation of several lines defined by the transmission scheme selected by considering the quality of transmission of the transmission path on which the packet is transmitted, wherein when each path uses a distinct transmission trajectory, the transmission scheme is selected from at least two different transmission schemes dependent upon quality of transmission on at least one of the paths, and wherein transmission trajectory is defined by a specific configuration of at least one antenna among a send antenna included in the source node and a receive antenna included in the destination node.

2. The method for transmitting according to claim 1, wherein each of the first and second a video streams comprises images compressed according to a predetermined compressed scheme, each of the first and second video streams comprising first and second types of compressed lines, the compressed lines of the first type comprising additional information not present in the compressed lines of the second type and enabling a decompression of the compressed lines of the second type.

3. The method for transmitting according to claim 2, wherein said predetermined compression scheme is a scheme for compression by chromatic sub-sampling, the lines of the first type comprising chrominance information and the lines of the second type comprising no chrominance information.

4. The method for transmitting according to claim 2, wherein, in said step of selecting, if the quality of transmission is substantially identical on said first and second paths, a first transmission scheme is selected such that:
on the first path, lines are transmitted according to a predetermined alternation of lines of the first type of the first video stream and lines of the second type of the second video stream;
on the second path, lines are transmitted according to a predetermined alternation of lines of the second type of the first video stream and lines of the first type of the second video stream.

5. The method for transmitting according to claim 2, wherein, in said step of selecting, if the quality of transmission on the first path is below the quality of transmission on the second path, a second transmission scheme is selected such that:
on the first path, lines are transmitted according to a predetermined alternation of lines of the first type of the first video stream and lines of the second type of the second video stream;
on the second path, lines are transmitted in a predetermined alternation of lines of the first type of the first video stream and lines of the first type of the second video stream, lines of the first type of at least one of the first and second video streams being not transmitted.

6. The method for transmitting according to claim 2, wherein, in said step of selecting, if the first path is inoperative, a third transmission scheme is selected such that:
on the second path, lines are transmitted according to a predetermined alternation of lines of the first and second types of the first video stream and lines of the first and second types of the second video stream, lines of the first type of at least one of the first and second video streams being not transmitted.

7. The method for transmitting according to claim 1, wherein each of the first and second video streams comprises images having even-parity indexed lines and odd-parity indexed lines.

8. The method for transmitting according to claim 7, comprising a step of applying a predetermined transmission scheme such that:
on the first path, lines are transmitted according to a predetermined alternation of even-parity indexed lines of the first video stream and odd-parity indexed lines of the second video stream;
on the second path, lines are transmitted according to a predetermined alternation of odd-parity indexed lines of the first video stream and even-parity indexed lines of the second video stream.

9. The method for transmitting according to claim 1, comprising a step of dividing a source content to obtain said at least first and second video streams.

10. A method for receiving, by means of a destination node, at least first and second video streams, each comprising images, transmitted by a source node via at least first and second transmission paths, comprising steps of:
receiving via at least one of said transmission paths packets of lines each comprising a predetermined alternation of several lines of the first video stream and several lines of the second video stream; and
recomposing each of said first and second video streams as a function of the received packets of lines, said first and second video streams having been subdivided by the source node into a succession of image lines comprising several pairs of successive lines, each pair comprising a line of a first type and a line of a second type,
wherein the received packets of lines are dependent upon a transmission scheme selected from a plurality of transmission schemes based upon a function of at least one piece of information on quality of transmission on at least one of the paths.

11. The method for receiving according to claim 10, comprising a step of reconstituting a source content from the at least two recomposed contents.

12. A non-transitory computer-readable storage medium storing a computer program comprising a set of instructions executable by a computer to implement a method for transmitting at least first and second video streams, each comprising images, by means of a source node to a destination node via at least first and second transmission paths, said method for transmitting comprising steps of:
sub-dividing each of said first and second video streams into a succession of image lines;
selecting a transmission scheme as a function of at least one piece of information on quality of transmission on at least one of the paths, said transmission scheme defining, for each path, a predetermined alternation of several lines of the first video stream and several lines of the second video stream; and
transmitting, on at least one of said paths, packets of lines each packet comprising the predetermined alternation of several lines defined by the transmission scheme selected by considering the quality of transmission of the transmission path on which the packet is transmitted, wherein when each path uses a distinct transmission trajectory, the transmission scheme is selected from at least two different transmission schemes dependent upon quality of transmission on at least one of the paths, and wherein transmission trajectory is defined by a specific configuration of at least one antenna among a send antenna included in the source node and a receive antenna included in the destination node.

13. A non-transitory computer-readable storage medium storing a computer program comprising a set of instructions executable by a computer to implement a method for receiving, by means of a destination node, at least first and second video streams, each comprising images, transmitted by a source node via at least first and second transmission paths, said method for receiving comprising steps of:
- receiving via at least one of said transmission paths packets of lines each comprising a predetermined alternation of several lines of the first video stream and several lines of the second video stream; and
- recomposing each of said first and second video streams as a function of the received packets of lines, said first and second video streams having been subdivided by the source node into a succession of image lines comprising several pairs of successive lines, each pair comprising a line of a first type and a line of a second type,
- wherein the received packets of lines are dependent upon a transmission scheme selected from a plurality of transmission schemes based upon a function of at least one piece of information on quality of transmission on at least one of the paths.

14. A source node for transmitting at least first and second video streams, each comprising images, to a destination node via at least first and second transmission paths, said source node comprising:
- means for sub-dividing each of said first and second video streams into a succession of image lines;
- means for selecting a transmission scheme as a function of at least one piece of information on quality of transmission on at least one of the paths, said transmission scheme defining, for each path, a predetermined alternation of several lines of the first video stream and several lines of the second video stream; and
- means for transmitting via at least one of said paths, packets of lines each packet comprising the predetermined alternation of several lines defined by the transmission scheme selected by considering the quality of transmission of the transmission path on which the packet is transmitted,
- wherein when each path uses a distinct transmission trajectory, the transmission scheme is selected from at least two different transmission schemes dependent upon quality of transmission on at least one of the paths, and
- wherein transmission trajectory is defined by a specific configuration of at least one antenna among a send antenna included in the source node and a receive antenna included in the destination node.

15. A destination node for receiving at least first and second video streams, each comprising images, transmitted by a source node via at least first and second transmission paths, said destination node comprising:
- means for receiving via at least one of said transmission paths packets of lines each comprising a predetermined alternation of several lines of the first video stream and several lines of the second video stream; and
- means for recomposing each of said first and second video streams as a function of received packets of lines, said first and second video streams having been subdivided by the source node into a succession of image lines comprising several pairs of successive lines, each pair comprising a line of a first type and a line of a second type,
- wherein the received packets of lines are dependent upon a transmission scheme selected from a plurality of transmission schemes based upon a function of at least one piece of information on quality of transmission on at least one of the paths.

* * * * *